(12) United States Patent
Furukawa et al.

(10) Patent No.: US 9,026,317 B2
(45) Date of Patent: May 5, 2015

(54) DISPLAY UNIT OF WORK MACHINE AND WORK MACHINE MOUNTED WITH THE DISPLAY UNIT

(75) Inventors: Jiro Furukawa, Chigasaki (JP); Kentarou Tajima, Hiratsuka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 13/817,223

(22) PCT Filed: Aug. 16, 2012

(86) PCT No.: PCT/JP2012/070855
§ 371 (c)(1),
(2), (4) Date: Feb. 26, 2013

(87) PCT Pub. No.: WO2013/046988
PCT Pub. Date: Apr. 4, 2013

(65) Prior Publication Data
US 2014/0058635 A1    Feb. 27, 2014

(30) Foreign Application Priority Data
Sep. 29, 2011   (JP) .................................. 2011-215160

(51) Int. Cl.
*G01F 9/00*       (2006.01)
*E02F 9/26*       (2006.01)
(Continued)

(52) U.S. Cl.
CPC . *E02F 9/26* (2013.01); *B60R 16/02* (2013.01); *G01F 9/00* (2013.01); *B60K 35/00* (2013.01); *B60R 16/0236* (2013.01); *E02F 9/267* (2013.01)

(58) Field of Classification Search
USPC ................... 180/65.21, 65, 265, 65.27, 65.31
See application file for complete search history.

(56) References Cited

U.S. PATENT DOCUMENTS 5,781,872 A *  7/1998  Konishi et al. .................. 701/36
6,453,731 B1   9/2002  Yaegashi
(Continued)

FOREIGN PATENT DOCUMENTS

DE   112004001554 T5   6/2006
JP   2007-078699 A     3/2007
(Continued)

OTHER PUBLICATIONS

International Search Report from International Application No. PCT/JP2012/070855 (in Japanese), dated Nov. 13, 2012, 2 pages.
(Continued)

*Primary Examiner* — John R Olszewski
*Assistant Examiner* — James M McPherson
(74) *Attorney, Agent, or Firm* — Fish & Richardson P.C.

(57) ABSTRACT

A multimonitor (display unit) is mounted in a mobile construction machine including an undercarriage and working equipment each driven by an engine, the multimonitor receiving a data of instant fuel consumption from a controller for controlling a fuel quantity to be supplied to the engine. The multimonitor includes a display including a single eco gauge (fuel-consumption indicator) for displaying fuel consumption in a street mode in which an undercarriage is operated and fuel consumption in a work mode in which working equipment is operated, a 100%-gauge fuel-consumption calculator that calculates a full-scale fuel consumption value in a full scale of the eco gauge based on target fuel consumption in the respective modes, and a gauge-display-value calculator that calculates a ratio of the instant fuel consumption to the 100% fuel consumption calculated by the 100%-gauge fuel-consumption value calculator.

12 Claims, 16 Drawing Sheets

(51) Int. Cl.
  *B60R 16/02*  (2006.01)
  *B60K 35/00*  (2006.01)
  *B60R 16/023* (2006.01)

(56) References Cited

U.S. PATENT DOCUMENTS

| | | | | |
|---|---|---|---|---|
| 7,483,814 | B2* | 1/2009 | Hoshi et al. | 702/182 |
| 8,082,774 | B2* | 12/2011 | Watson et al. | 73/114.54 |
| 8,151,207 | B2* | 4/2012 | Shimazu et al. | 715/772 |
| 8,228,180 | B2* | 7/2012 | Levy et al. | 340/439 |
| 8,600,652 | B2* | 12/2013 | Mizutani | 701/123 |
| 2006/0017552 | A1* | 1/2006 | Andreasen et al. | 340/438 |
| 2006/0287841 | A1 | 12/2006 | Hoshi et al. | |
| 2009/0174538 | A1* | 7/2009 | Shibata et al. | 340/438 |
| 2010/0207755 | A1 | 8/2010 | Watson et al. | |
| 2012/0245760 | A1* | 9/2012 | Ikeya | 701/1 |

FOREIGN PATENT DOCUMENTS

| | | | |
|---|---|---|---|
| JP | 2008-062791 A | | 3/2008 |
| JP | 2008-197076 A | | 8/2008 |
| KR | 10-2007-039243 A | | 4/2007 |
| WO | WO2010079691 A1 | | 7/2010 |
| WO | WO 2011/074672 | * | 6/2011 |

OTHER PUBLICATIONS

Office Action issued Apr. 15, 2014 in corresponding Korean Patent Application No. 10-2013-7003968, including English translation, 7 pages.

Office Action issued on Nov. 2, 2014 in corresponding Chinese Patent Application No. 201280002453.7, including English translation, 17 pages.

Office Action issued Jul. 11, 2014 in corresponding German patent application No. 112012004077.5, including English translation, 9 pages.

* cited by examiner

DISPLAY UNIT OF WORK MACHINE AND WORK MACHINE MOUNTED WITH THE DISPLAY UNIT

CROSS-REFERENCE TO RELATED APPLICATIONS

This application claims priority to International Application No. PCT/JP2012/070855 filed on Aug. 16, 2012, which application claims priority to Japanese Application No. 2011-215160, filed on Sep. 29, 2011. The contents of the above applications are incorporated herein by reference in their entireties.

TECHNICAL FIELD

The present invention relates to a display unit of a work machine and a work machine mounted with the display unit. More specifically, the present invention relates to a work machine such as a mobile construction machine and an industrial vehicle that are capable of running on public roads, and a display unit mounted on the construction machine and the industrial vehicle.

BACKGROUND ART

A construction machine (a kind of work machine) in a form of a wheeled hydraulic excavator (simply referred to as a "hydraulic excavator" hereinafter) that is capable of running on public roads has been known. Such a hydraulic excavator is powered by an engine (e.g. a diesel engine) to be adapted to drive a travelling mechanism for traveling and to actuate working equipment for excavation work and the like. When fuel consumption of such a hydraulic excavator is to be analyzed, fuel consumption when the working equipment attached to a vehicle body of the hydraulic excavator is working (referred to as a "work mode" hereinafter) and fuel consumption when the hydraulic excavator is autonomously travelling for moving the hydraulic excavator (referred to as a "street mode" hereinafter) have to be separately considered. Since there is a large difference between the fuel consumption during the work mode and the fuel consumption during the street mode, the fuel consumption in the respective operation modes has to be separately evaluated for determining the fuel-efficiency/inefficiency of the hydraulic excavator. In other words, since a load applied on the engine (i.e. use range of engine output) differs between the work mode and the street mode, fuel amount consumed by the engine (average fuel consumption) differs between respective operation modes.

In recent years, in response to a growing demand for energy saving on work machines, some of construction machines include a display unit that is mounted in an operator's cab of a work machine and is adapted to graphically display information representing a variation in fuel consumption or information indicating past results of the fuel consumption. On the other hand, when fuel consumption is to be graphically displayed on a fuel-consumption indicator of such a display unit, a target fuel-consumption line indicating a border corresponding to target fuel consumption is sometimes displayed on the fuel-consumption indicator in order for an operator of the work machine to recognize whether the actual fuel consumption is within the target fuel consumption or not. With the status of the fuel consumption being displayed on the fuel-consumption indicator in the above-described format, the operator can visually recognize the actual fuel consumption and the target fuel-consumption line and is inclined to perform a drive operation (i.e. an operation for work or travelling) so as to keep the fuel consumption under the target fuel-consumption line. Since the target fuel-consumption line is displayed on the display unit, the operator keeps a drive operation for economical work or travelling in mind.

Incidentally, since the average fuel consumption largely differs between the street mode and the work mode as described above, the target fuel consumption also differs in the respective operation modes. Accordingly, the fuel-consumption indicator of the display unit on which the fuel consumption is to be displayed has to be provided with separate target fuel-consumption lines corresponding to each of the operation modes.

However, even when one tries to separately provide the fuel-consumption indicators on the display unit corresponding to each of the operation modes, there is a limitation of allowable area capable of being occupied by the fuel-consumption indicator on the display unit. The display unit mounted in a work machine not only displays the fuel consumption but also notifies to an operator or a serviceman a cooling-water temperature of the engine of the work machine, a hydraulic oil temperature for hydraulically driving the traveling mechanism or working equipment, residual fuel level, cumulative operation time of the work machine (service meter), various abnormality information and the like. Further, since the operator of the work machine performs an operation while looking at a work site outside the operator's cab, it is not desirable for the display unit mounted in the operator's cab to be sized to block the operator's view. Thus, when the fuel-consumption indicators are separately provided on the display unit corresponding to each of the operation modes, the display area for the above-mentioned various information become small, thereby deteriorating visibility.

An attempt for displaying the fuel consumption in the respective operation modes on a single fuel-consumption indicator would cause a different problem due to the above-described difference in the target fuel consumption in the respective operation modes. In general, the average fuel consumption in the work mode is smaller than the average fuel consumption in the street mode (i.e. less fuel is consumed per a unit time in the work mode), so that the target fuel consumption in the work mode becomes smaller than the target fuel consumption in the street mode.

If the target fuel consumption or the target fuel-consumption line displayed on the display unit is designed primarily in consideration of the work mode, fuel consumption larger than the work mode is displayed during the traveling in the street mode, so that the operator is obliged to view the fuel consumption level larger than the target fuel consumption depending on the traveling condition. Accordingly, the operator viewing the display unit cannot perform a drive operation for economical driving in view of the display of the actual fuel consumption relative to appropriate target fuel consumption in the street mode.

On the other hand, if the target fuel consumption or the target fuel-consumption line is designed primarily in consideration of the street mode, fuel consumption smaller than the street mode is displayed during the operation in the work mode, so that the operator is obliged to view the fuel consumption level smaller than the target fuel consumption depending on the working condition. Thus, the operator viewing the display unit assumes that the operation can be performed within the target fuel consumption even with slightly larger fuel consumption, so that the operator performs an operation that exceeds the originally intended target fuel consumption during the work mode, thereby failing to perform a drive operation for economical work.

In view of the above, a display unit that is adapted to change the setting of the target fuel consumption as desired with a single fuel-consumption indicator (eco gauge) has been proposed (see Patent Literature 1). With the above display unit, the display screen can be switched to a target-setting screen by a predetermined display operation and the target fuel consumption can be changed in the target-setting screen.

CITATION LIST

Patent Literature

Patent Literature 1 JP-A-2008-62791

SUMMARY OF THE INVENTION

Problems to be Solved by the Invention

However, in the technique disclosed in Patent Literature, the target fuel consumption is changed according to various operation details with different work environment and work load during an operation of a work vehicle, where it is not supposed to change the target fuel consumption between the street mode and the work mode in a work machine such as a mobile hydraulic excavator. Specifically, though Patent Literature 1 is directed to a crawler hydraulic excavator, such a crawler hydraulic excavator moves in a work site only a little and it is not necessary to separately consider the fuel consumption during the travelling and the fuel consumption during the work operation. Further, such a crawler hydraulic excavator is carried in a trailer toward a work site and is autonomously moved only in a short distance.

In addition, the technique disclosed in Patent Literature 1 requires an operator's operation for changing the target fuel consumption, so that additional work is required for changing the target fuel consumption.

An object of the invention is to provide a display unit that is adapted to automatically change the target fuel consumption corresponding to each of the street mode and the work mode and to appropriately display the fuel consumption in the respective operation modes with a single fuel-consumption indicator, and a work machine mounted with the display unit.

Means for Solving the Problems

A display unit according to a first aspect of the invention is mounted in a mobile work machine including an undercarriage and working equipment that are each driven by an engine, the display unit receiving data of instant fuel consumption from an engine controller that controls a fuel quantity to be supplied to the engine, the display unit including: a single fuel-consumption indicator that displays fuel consumption in a street mode in which the undercarriage is operated and fuel consumption in a work mode in which the working equipment is operated; a full-scale fuel-consumption value calculator that calculates a fuel consumption value at a full scale of the fuel-consumption indicator based on target fuel consumption in the street mode and target fuel consumption in the work mode; and a gauge-display-value calculator that calculates a ratio of the instant fuel consumption to the fuel consumption at the full scale calculated by the full-scale fuel-consumption value calculator.

According to the above aspect of the invention, the 100%-gauge fuel-consumption value for each of the operation modes is calculated using the target fuel consumption corresponding to each of the operation modes, the ratio of the instant fuel consumption value relative to the 100%-gauge (full scale) fuel-consumption value is calculated and the fuel consumption is automatically displayed based on the ratio. Thus, the display format of actual fuel consumption within the target fuel consumption or the display format of the actual fuel consumption exceeding the target fuel consumption can be made common to the respective operation modes, whereby the fuel consumption in the respective modes can be appropriately displayed using the single fuel-consumption indicator.

The display device according to a second aspect of the invention includes a scale-conversion-coefficient setting table in which a scale conversion coefficient for converting one of the target consumption in the street mode and the target consumption in the work mode into the other of the target consumption in the street mode and the target consumption in the work mode is set.

According to the above aspect of the invention, when the 100%-gauge (full scale) fuel consumption value is to be calculated, it is not necessary to calculate the target fuel consumption in the respective operation modes, so that the memory capacity for calculating the fuel consumption can be saved.

The display unit according to a third aspect of the invention includes: a mode determining section that determines whether an operation mode of the mobile work machine is the street mode or the work mode in the mobile work machine, in which the mode determining section determines that the mobile work machine is in the street mode and sends information that the mobile work machine is in the street mode to the display unit, when it is determined that: (1) a swing position detector that is provided in the mobile work machine and detects a position of an upper swing body of the mobile work machine in a swing direction detects that the upper swing body is at a predetermined position; (2) a working equipment lock unit that is provided in the mobile work machine and locks an operation of the working equipment of the mobile work machine outputs an operation signal for locking the working equipment; and (3) a suspension cylinder lock unit that is provided to the mobile work machine and frees an operation of a suspension cylinder of the undercarriage of the mobile work machine outputs an operation signal for freeing the suspension cylinder, and when the full-scale fuel-consumption value calculator receives the information indicating that the mobile work machine is in the street mode, the full-scale fuel-consumption value calculator reads out a scale conversion coefficient corresponding to the street mode from the scale conversion coefficient setting table and calculates the fuel consumption value at the full scale.

In the display unit according to a fourth aspect of the invention, the single fuel-consumption indicator displays current instant fuel consumption in a bar at an end portion of the display together with a target fuel-consumption line.

A mobile work machine according to a fifth aspect of the invention includes: an engine; an undercarriage and working equipment each driven by the engine; a display unit; and an engine controller that controls a fuel quantity to be supplied to the engine, in which the display unit comprises: a single fuel-consumption indicator that is adapted to receive a data of instant fuel consumption from the engine controller and displays fuel consumption in a street mode in which the undercarriage is operated and fuel consumption in a work mode in which the working equipment is operated; a full-scale fuel-consumption value calculator that calculates a fuel consumption value at a full scale of the fuel-consumption indicator based on target fuel consumption in the street mode and target fuel consumption in the work mode; and a gauge-display-value calculator that calculates a ratio of the instant fuel consumption to the fuel consumption at the full scale calculated by the full-scale fuel-consumption value calculator.

According to the above aspect of the invention, the same advantages as in the above-described first aspect of the invention can be obtained for achieving an object of the invention.

In the work machine according to a sixth aspect of the invention, the display unit comprises a scale-conversion-coefficient setting table in which a scale conversion coefficient for converting one of the target consumption in the street mode and the target consumption in the work mode into the other of the target consumption in the street mode and the target consumption in the work mode is set.

In the work machine according to a seventh aspect of the invention, the display unit comprises a mode determining section that determines whether an operation mode of the mobile work machine is the street mode or the work mode in the mobile work machine, in which the mode determining section determines that the mobile work machine is in the street mode and sends information that the mobile work machine is in the street mode to the display unit, when it is determined that: (1) a swing position detector that is provided in the mobile work machine and detects a position of an upper swing body of the mobile work machine in a swing direction detects that the upper swing body is at a predetermined position; (2) a working equipment lock unit that is provided in the mobile work machine and locks an operation of the working equipment of the mobile work machine outputs an operation signal for locking the working equipment; and (3) a suspension cylinder lock unit that is provided to the mobile work machine and frees an operation of a suspension cylinder of the undercarriage of the mobile work machine outputs an operation signal for freeing the suspension cylinder, and when the full-scale fuel-consumption value calculator receives the information indicating that the mobile work machine is in the street mode, the full-scale fuel-consumption value calculator reads out a scale conversion coefficient corresponding to the street mode from the scale conversion coefficient setting table and calculates the fuel consumption value at the full scale.

In the work machine according to an eighth aspect of the invention, the single fuel-consumption indicator of the display unit displays current instant fuel consumption in a bar at an end portion of the display together with a target fuel-consumption line.

According to the work machine display unit and the work machine mounted with the display unit of the above aspects of the invention, the target fuel consumption corresponding to each of the street mode and the work mode is automatically switched in accordance with the switching of the operation modes, the fuel consumption in the respective operation modes is displayed in the single fuel-consumption indicator, and the position of the target fuel-consumption line displayed on the fuel-consumption indicator stays constant irrespective of the switching of the operation modes, so that the fuel consumption status can be appropriately displayed on the display unit.

EXEMPLARY EMBODIMENT(S)

Exemplary embodiment(s) of the invention will be described below with reference to the attached drawings.

Figure 1:
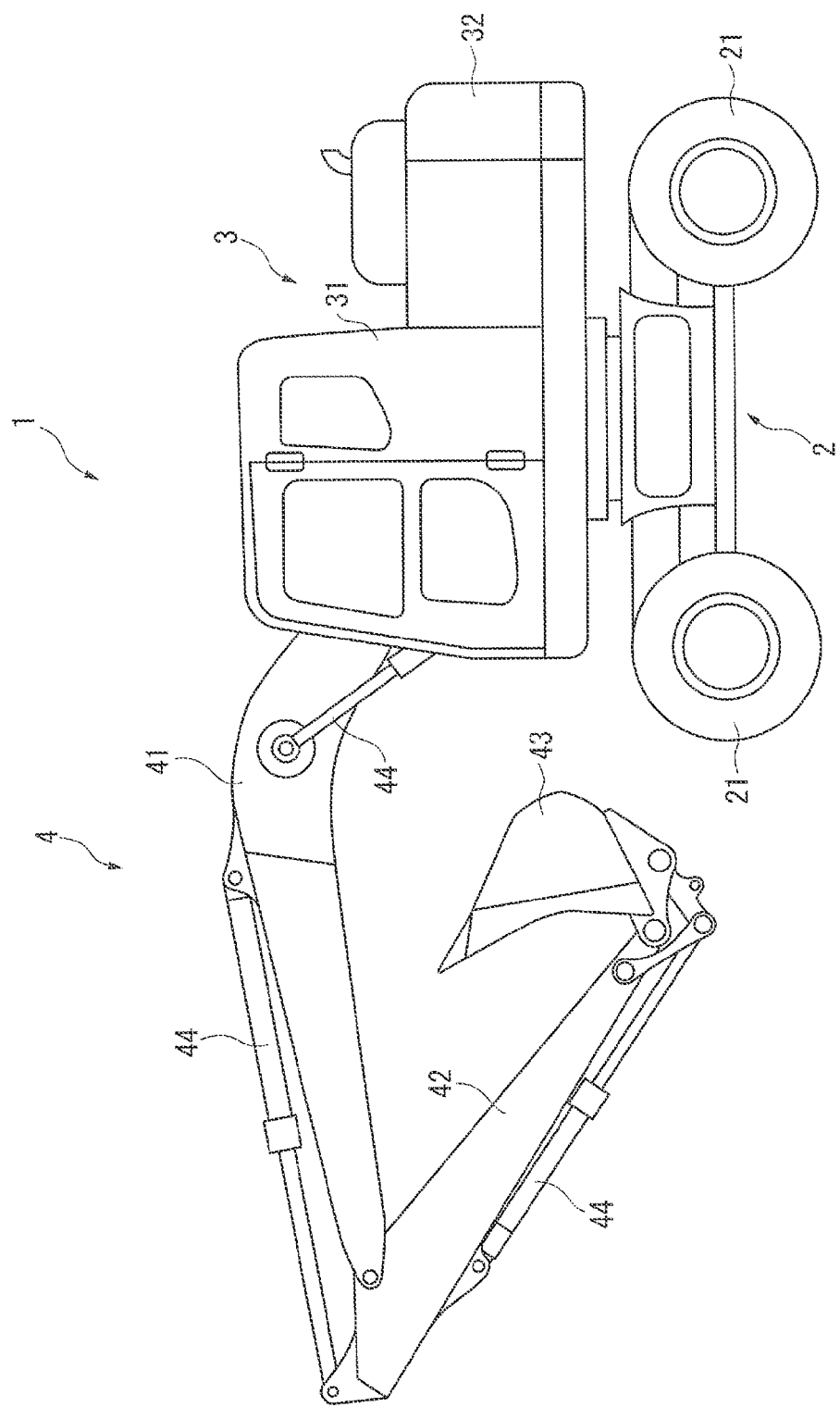
FIG. 1 is a side elevation showing an entirety of a work machine according to an exemplary embodiment of the invention.
Figure 2:
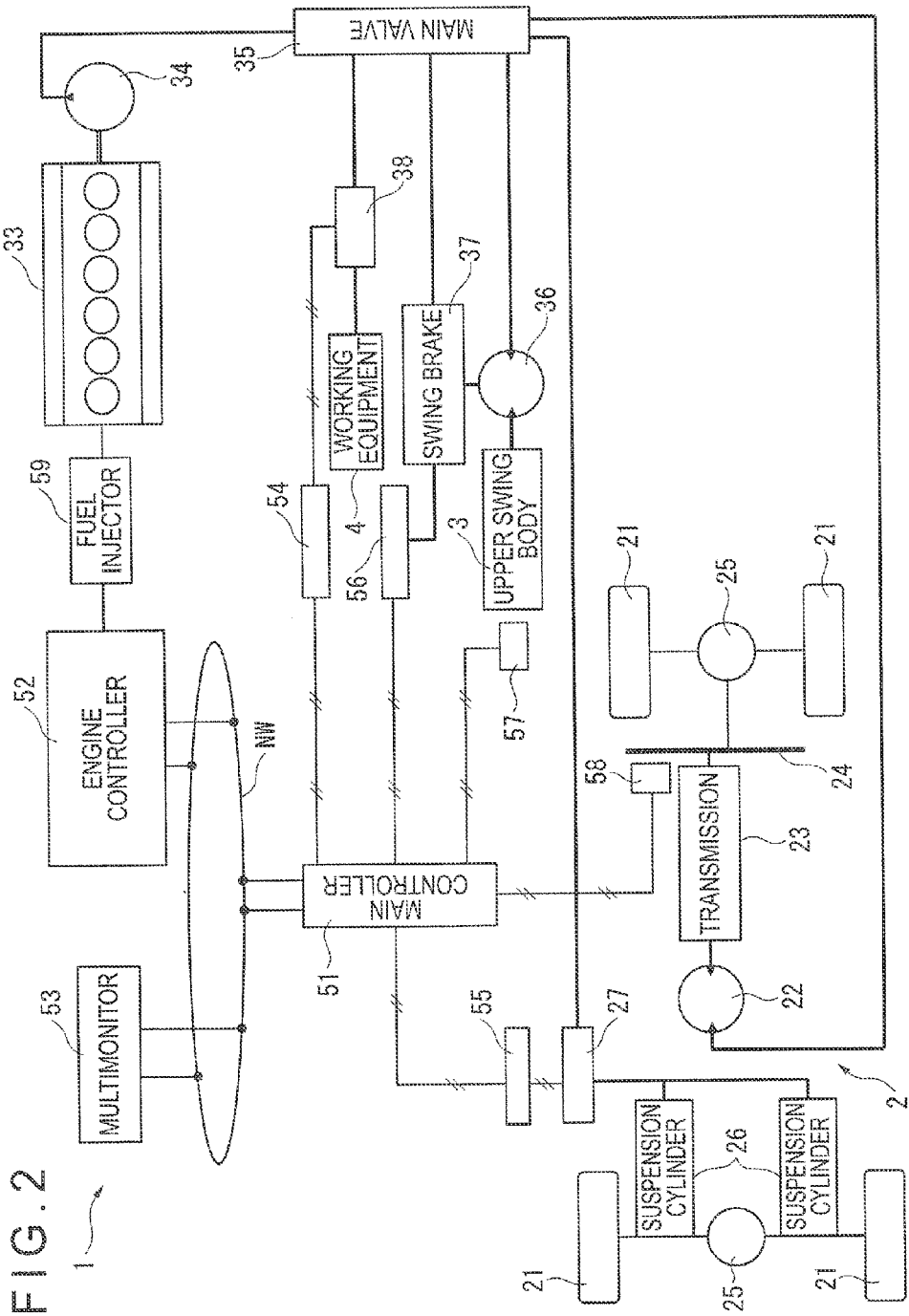
FIG. 2 is a block diagram schematically showing a structure of the work machine.

FIGS. 1 and 2 show a kind of work machine (construction machine) in a form of a wheeled hydraulic excavator 1 (referred to as a hydraulic excavator 1 hereinafter) according to the exemplary embodiment. The hydraulic excavator 1 includes an undercarriage 2 having tires 21 at a front right and left and to rear right and left of a vehicle body, an upper swing body 3 rotatably provided on the undercarriage 2 via a swing circle, and working equipment 4 attached to the upper swing body 3. In other words, the hydraulic excavator 1 is an autonomously mobile construction machine.

A hydraulic motor 22 is attached to the undercarriage 2. When an engine 33 is driven, a hydraulic pump 34 is rotated and hydraulic oil discharged from the hydraulic pump 34 is fed to the running motor 22 to rotate the running motor 22. The drive force of the running motor 22 is transmitted via a power transmission mechanism to rotate each of the tires 21 (see FIG. 2). An outrigger for stabilizing the vehicle body during an operation (e.g. excavation) by the hydraulic excavator 1, a blade for pushing or leveling sand and earth or the like is sometimes provided to the undercarriage 2.

An operator cab (operator's seat) 31 is disposed at a front side of a body of the upper swing body 3. A driver sheet for an operator, a later-described multimonitor (display unit) 53, a control lever for operating the working equipment 4, for swinging the upper swing body 3 and for effecting a travel of the undercarriage 2, and the like are provided in the operator cab 31. A machine room housing the engine 33, the hydraulic pump 34 and the like is disposed at the rear side of the operator cab 31. A fuel tank in which a fuel for driving the engine 33 is stored, a hydraulic oil tank in which hydraulic oil for hydraulically driving a hydraulic cylinder 44 of the working equipment 4, the hydraulic pump 34 or the running motor 22 and the like are disposed at a lateral of the operator cab 31. A counterweight 32 serving as a weight for balancing an action of the vehicle body during, for instance, the excavation work by the working equipment 4 is attached to a rear side of the machine room.

The working equipment 4 includes a boom 41, an arm 42, a bucket 43 and a plurality of hydraulic cylinders 44 that actuate the boom 41, the arm 42 and the bucket 43.

FIG. 2 is a block diagram of the hydraulic excavator 1. The hydraulic excavator 1 is described in more detail below with reference to the block diagram.

An output shaft of the engine 33 is mechanically connected with an input shaft of the hydraulic pump 34. The hydraulic pump 34 is rotated by driving the engine 33. The flow of the hydraulic oil discharged from the hydraulic pump 34 is switched at a main valve 35 to be supplied to each of below-described hydraulic devices including travel, swing and working equipment systems.

Initially, the travel system will be described below. The hydraulic oil passing through the main valve 35 is supplied to the running motor 22 provided by a hydraulic motor. The drive force of the running motor 22 is transmitted from a transmission 23 to a PTO (Power Take Off) 24, and is further transmitted to the tires 21 via an axle 25. The PTO 24 includes various gears and a clutch. Incidentally, though a rear-side two-wheel drive is illustrated in FIG. 2, a four-wheel drive in which the drive force outputted from the transmission 23 is distributed to front and rear sides, the drive force is transmitted to front and rear axles via a propeller shaft and four tires 21 are driven via the front and rear axles, may alternatively be employed.

Further, in the travel system, a suspension cylinder 26 is provided to a suspension part of each of the front tires 21, and the hydraulic oil supplied to the suspension cylinder 26 is supplied from the main valve 35 through a suspension lock valve 27. The suspension cylinder 26 restricts vertical extension and retraction of the suspension cylinder 26 ("suspension lock") during an operation using the working equipment 4 to restrain a rocking movement of the vehicle body of the hydraulic excavator 1, thereby ensuring workability during an excavation operation. On the other hand, when the hydraulic excavator 1 is to be travelled, in order to ensure comfortable ride during the travelling, the suspension lock is released ("suspension free") after receiving a later-described predetermined electric signal, so that vertical extension and retraction of the suspension cylinder 26 in accordance with irregularities on the road surface are enabled. Incidentally, FIG. 2 is simplified so that the suspension cylinder 26 is provided only on the front tires. The suspension cylinders 26 (total four) are provided on the front and rear tires 21 of the undercarriage 2, so that the suspension cylinders 26 on the front and rear tires can be simultaneously set to "suspension lock" or "suspension free."

Next, the swing system will be described below. In the swing system, the hydraulic oil having passed through the main valve 35 is supplied to a swing motor 36 provided in the upper swing body 3 to rotate the swing motor 36. The output shaft of the swing motor 36 is coupled with swing machinery (not shown: sometimes referred to as swing reducer). A pinion gear provided to an output shaft of the swing machinery is meshed with an internal tooth provided to an inner race member of a circular swing circle (not shown: sometimes referred to as a swing bearing). The swing circle is provided by an outer race member and an inner race member. The outer race member is mechanically fixed on the upper swing body 3. The inner race member provided with the internal tooth is mechanically fixed on a frame of the undercarriage 2. Thus, the upper swing body 3 is rotated by rotating the swing machinery.

A swing brake 37 is provided to the swing motor 36. Though detailed hydraulic circuit is not illustrated, the hydraulic oil supplied to the swing brake 37 is also supplied via the main valve 35. Though detailed later, when the swing brake 37 is actuated, the rotary drive of the swing motor 36 is restricted to brake the upper swing body 3.

Next, the working equipment system will be described below. Though detailed hydraulic circuit is not illustrated, the hydraulic oil of which flow rate is regulated by the main valve 35 passes through a PPC (Pressure Proportional Control) lock valve 38 to be supplied to a PPC valve provided to a control lever (not shown) as a pilot hydraulic pressure. During the operation in the work mode, the pilot hydraulic pressure generated in accordance with an operator's operation on the control lever is supplied to a control valve (not shown) to actuate each of the hydraulic cylinders 44 of the working equipment 4.

An arrangement related to electronics of the hydraulic excavator 1 will be described below.

As shown in FIG. 2, the hydraulic excavator 1 includes a main controller 51 and an engine controller 52 that include electronic components such as a numerical processor and storage device (e.g. CPU and memory device such as ROM and RAM). Various software that runs in the controllers 51 and 52 is stored in the storage device of the controllers 51 and 52. Further, the hydraulic excavator 1 includes a multimonitor 53 (display unit). These electronics are connected in a manner capable of mutual communication via an in-vehicle network NW (CAN: Controller Area Network).

Figure 9:
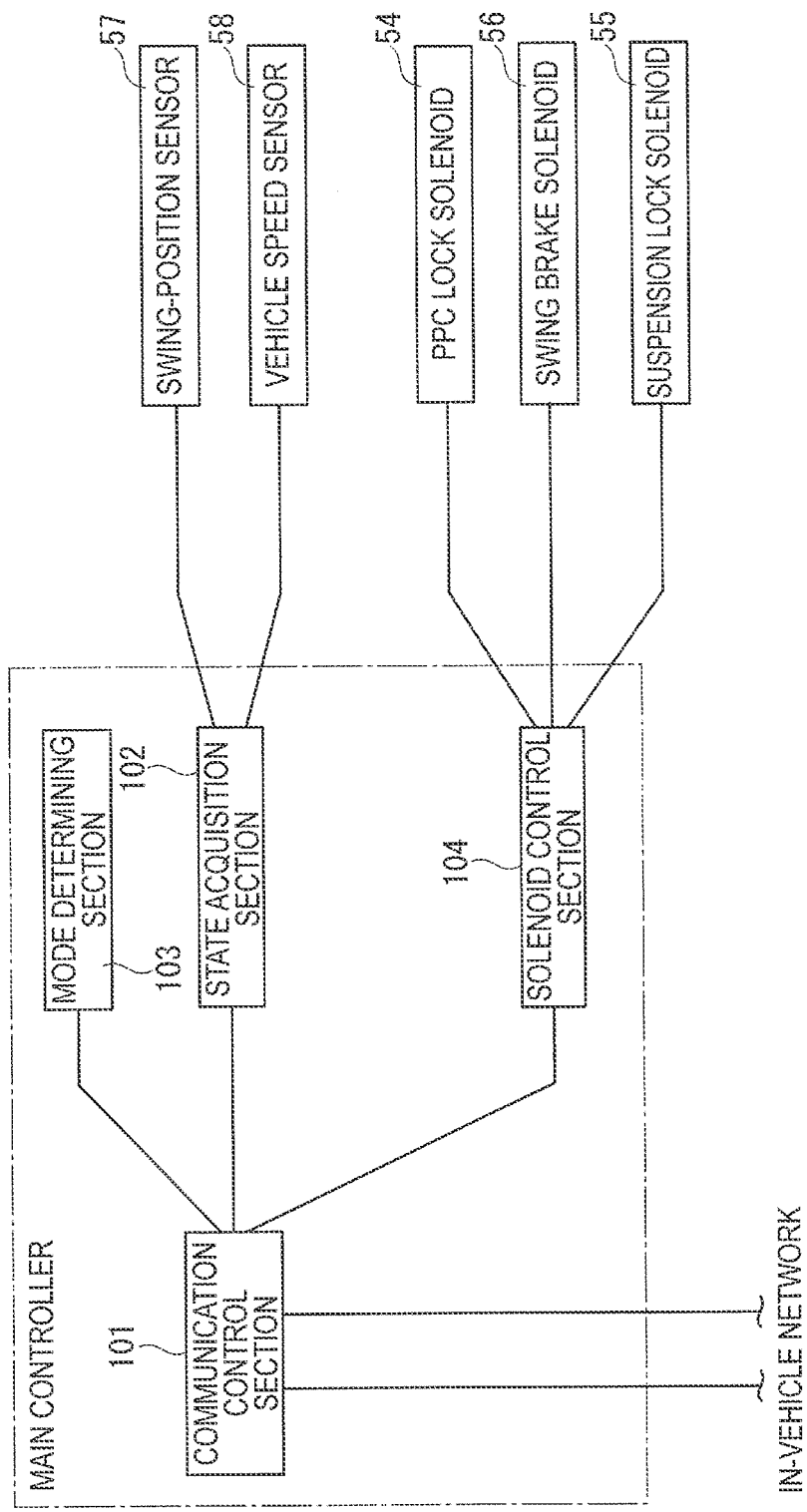
FIG. 9 is a block diagram showing a control unit of the work machine.

The main controller 51 sends electric signals to a PPC lock solenoid 54 and a suspension lock solenoid 55 to magnetize or demagnetize each of the solenoids. When an operator operates a street-mode changeover switch 131 on a manipulating portion 114 (FIG. 5) on the multimonitor 53, an operation signal (a signal indicating a change from the work mode to the street mode) is sent to the main controller 51 via the in-vehicle network NW. When the hydraulic excavator 1 starts traveling, the main controller 51 receives the operation signal (the signal indicating a change from the work mode to the street mode) from the multimonitor 53 via a communication control section 101 (FIG. 9). Then, the main controller 51 sends a demagnetizing signal or a magnetizing signal to the PPC lock solenoid 54. The PPC lock solenoid 54 receiving the signal demagnetizes or demagnetizes and, in conjunction therewith, a PPC lock valve 38 is actuated to close an oil path that is in communication with the PPC lock valve 38 and a PPC valve (not shown). Since the oil path that is in communication with the PPC lock valve 38 and the PPC valve (not shown) is closed, even when the control lever for operating the working equipment 4 is manipulated, the pilot hydraulic pressure is not sent to the PPC valve (not shown) and the working equipment 4 is not actuated, whereby an operation restriction (working equipment lock) is effected. Incidentally, when the signal sent to the PPC lock solenoid 54 is a demagnetizing signal, which one of the working equipment lock and working equipment free is effected has been determined in advance.

When an operator operates a suspension-lock-mode changeover switch 132 on the manipulating portion 114 (FIG. 5) on the multimonitor 53, an operation signal (a signal indicating a change from restricting the extension and retraction of the suspension cylinder 26 (suspension lock) to releasing the restriction (suspension free)) is sent to the main controller 51 via the in-vehicle network NW. When the hydraulic excavator 1 starts travelling, the main controller 51 sends a demagnetizing signal or a magnetizing signal to the suspension lock solenoid 55. When receiving the signal, the suspension lock solenoid 55 demagnetizes or magnetizes and, in conjunction therewith, the suspension lock valve 27 is actuated. The suspension lock valve 27 is provided between each of the suspension cylinders 26 and an accumulator (not shown) that is in communication with each of the suspension cylinders 26 via a hydraulic circuit. The suspension lock valve 27 is opened when the hydraulic excavator 1 is travelling and thus the hydraulic circuit connecting each of the suspension cylinders 26 and the accumulator is opened. Accordingly, in accordance with the extension and retraction of the suspension cylinders 26, the pressure fluctuation in an oil chamber within each of the suspension cylinders 26 is sent to the accumulator. A gas chamber within the accumulator is thereby compressed or expanded to absorb an up-and-down motion of the hydraulic excavator 1 while travelling.

On the other hand, when an operator operates the suspension-lock-mode changeover switch 132 and the operation signal (a signal indicating a change from a state in which the extension and retraction of the suspension cylinders 26 are released (suspension free) to a state in which the extension and retraction of the suspension cylinders 26 are restricted (suspension lock)) is sent to the main controller 51 via the in-vehicle network NW, the main controller 51 sends a demagnetizing signal or a magnetizing signal to the suspension lock solenoid 55. When receiving the signal, the suspension lock solenoid 55 demagnetizes or magnetizes and, in conjunction therewith, the suspension lock valve 27 is closed, thereby closing the hydraulic circuit connecting each of the suspension cylinders 26 and the accumulator. Thus, the extension and retraction of the suspension cylinders 26 are restricted (suspension lock), thereby restraining the rocking movement of the vehicle body of the hydraulic excavator 1 during the excavation work using the working equipment 4. Incidentally, when the signal sent to the suspension lock solenoid 55 is a demagnetizing signal, which one of the suspension free and suspension lock is effected has been determined in advance.

Further, when receiving a predetermined signal, the main controller 51 sends a demagnetizing signal or magnetizing signal to a swing brake solenoid 56, thereby braking the swing motor 36 with the swing brake 37 so that the upper swing body 3 is not swung (swing lock). On the other hand, when receiving a predetermined signal, the main controller 51 sends a demagnetizing signal or magnetizing signal to the swing brake solenoid 56, thereby releasing the braking of the swing motor 36 (swing free) so as to allow a swing motion of the upper swing body 3 in accordance with an operation of the control lever for the swing motion. The predetermined signal refers to a signal that is generated when the respective control levers are set neutral and are not operated for a predetermined time (swing lock according to a first method) or a signal that is generated when a swing brake switch provided at a predetermined position in the operator cab 31 is manipulated (pushed) by an operator to command the swing brake (swing lock) (swing lock according to a second method). The swing brake switch may be provided to the manipulating portion 114 in a form of a push-button switch, or may be independently provided near the operator's seat. When one of the signals (referred to as a swing brake command signal hereinafter) is generated, the main controller 51 receiving the swing brake command signal sends a demagnetizing signal or a magnetizing signal to the swing brake solenoid 56. The swing brake command signal is also generated when the control lever is set neutral and is not operated for a predetermined time. The swing brake command signal is generated when the main controller 51 receives a signal from a position sensor for detecting an operation position of the control lever or a pressure sensor for detecting the pilot pressure and the conditions for generating the swing brake command signal are met according to time counted by a counter as described above. Incidentally, when an operator operates one of the control levers during the swing lock, i.e. while the swing lock according to the first method is effected or when an operator commands release of the brake (swing free) on the swing brake switch while the swing lock according to the second method is effected, a swing brake release command signal is generated. The main controller 51 receiving the swing brake release command signal sends a demagnetizing signal or a magnetizing signal to the swing brake solenoid 56.

A structure and an operation of the swing brake 37 will be described below. The swing brake 37 is a mechanical brake. When the swing brake solenoid 56 is demagnetized (or magnetized), a swing brake valve for closing or opening an oil path of a hydraulic oil provided in the swing brake 37 to a brake piston (not shown) is actuated. The swing brake solenoid 56 receiving the demagnetizing signal simultaneously actuates to close the oil path interlocked with the swing brake valve to drive the brake piston. Then, a disc and the like connected to the brake piston presses a rotary unit of the swing motor 36 to restrict the movement of the swing motor 36 (swing lock). Incidentally, the relationship between the demagnetizing signal or the magnetizing signal sent to the swing brake solenoid 56 and the swing lock or the release of restriction (swing free) of the swing motor 36 is designed so that the swing brake solenoid 56 receives the magnetizing signal to effect the swing lock, unlike the structure described above.

Further, a detection signal is inputted from the swing-position sensor 57 attached near the swing circle to the main controller 51. The swing-position sensor 57 is provided by, for instance, a contact-type limit switch. The swing-position sensor 57 is attached at at least two points along a circumferential direction of the swing circle. The swing-position sensor 57 detects whether a front-back orientation of the upper swing body 3 coincides with the front-back direction of the undercarriage 2 or not. In other words, the swing-position sensor 57 detects a relative positional relationship between the undercarriage 2 and the upper swing body 3 in the swing direction. Incidentally, the swing-position sensor 57 may detect the relative positional relationship between the undercarriage 2 and the upper swing body 3 in the swing direction using other devices such as an optical position detection sensor instead of the contact-type limit switch. Further, the attachment position of the swing-position sensor 57 is not limited to the location near the swing circle as long as the relative positional relationship between the undercarriage 2 and the upper swing body 3 in the swing direction can be detected.

Data indicating a current travel speed of the hydraulic excavator 1 detected by a vehicle speed sensor 58 provided to an output side of the transmission 23 is inputted to the main controller 51. Since the vehicle speed sensor 58 detects the current travel speed of the hydraulic excavator 1, the vehicle speed sensor 58 may be disposed at a position different from the output side of the transmission 23. For instance, the vehicle speed sensor 58 may be provided near a drive shaft (not shown) connecting the transmission 23 and the axle 25 to detect the rotary speed of the drive shaft to detect the travel speed.

The engine controller 52 outputs a fuel injection command signal to a fuel injector 59 including a common rail and an injector to electronically control the fuel injector 59, thereby regulating the fuel injection amount supplied to the engine 33 so that an appropriate engine output in accordance with a load during operation or travelling can be obtained. Though not illustrated, control maps of the fuel injection amount in a form of a map for the work mode (during work) and a map for the street mode (during travelling) are separately stored in a storage device such as the memory of the engine controller 52. The fuel injection command signal to the fuel injector 59 is generated based on the map for the respective operation modes. The engine controller 52 also calculates instant fuel consumption to the engine 33 based on the fuel injection command signal to the fuel injector 59.

Figure 5:
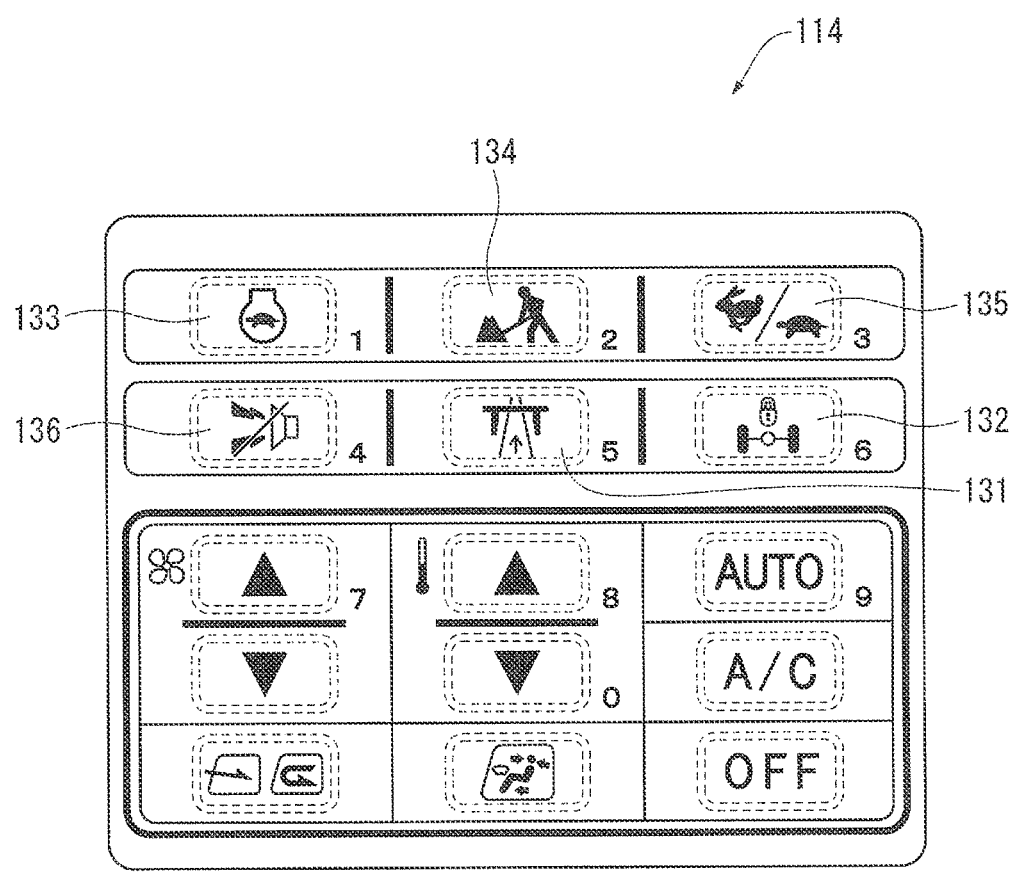
FIG. 5 is an illustration of a manipulating portion for operating the display unit.

The multimonitor 53 is mounted at a front side of the operator's seat in the operator cab 31. The multimonitor 53 includes a display 112 provided by a liquid crystal monitor and the like. The multimonitor 53 displays on the display 112 various information about the hydraulic excavator 1. The manipulating portion 114 on which various control switches are disposed as shown in FIG. 5 is provided at a lower part of the display 112 of the multimonitor 53 in a manner integrated with the display 112 within a casing. Incidentally, the multimonitor 53 may be designed so that the display 112 and the manipulating portion 114 are separated, where the display 112 is disposed at the front side of the operator's seat on which an operator is seated to ensure visibility and the manipulating portion 114 is disposed at a right or left side of the operator's seat within an easy reach of the operator to ensure operability. Further, the display 112 and the manipulating portion 114 may be provided using a touch panel.

Figure 3:
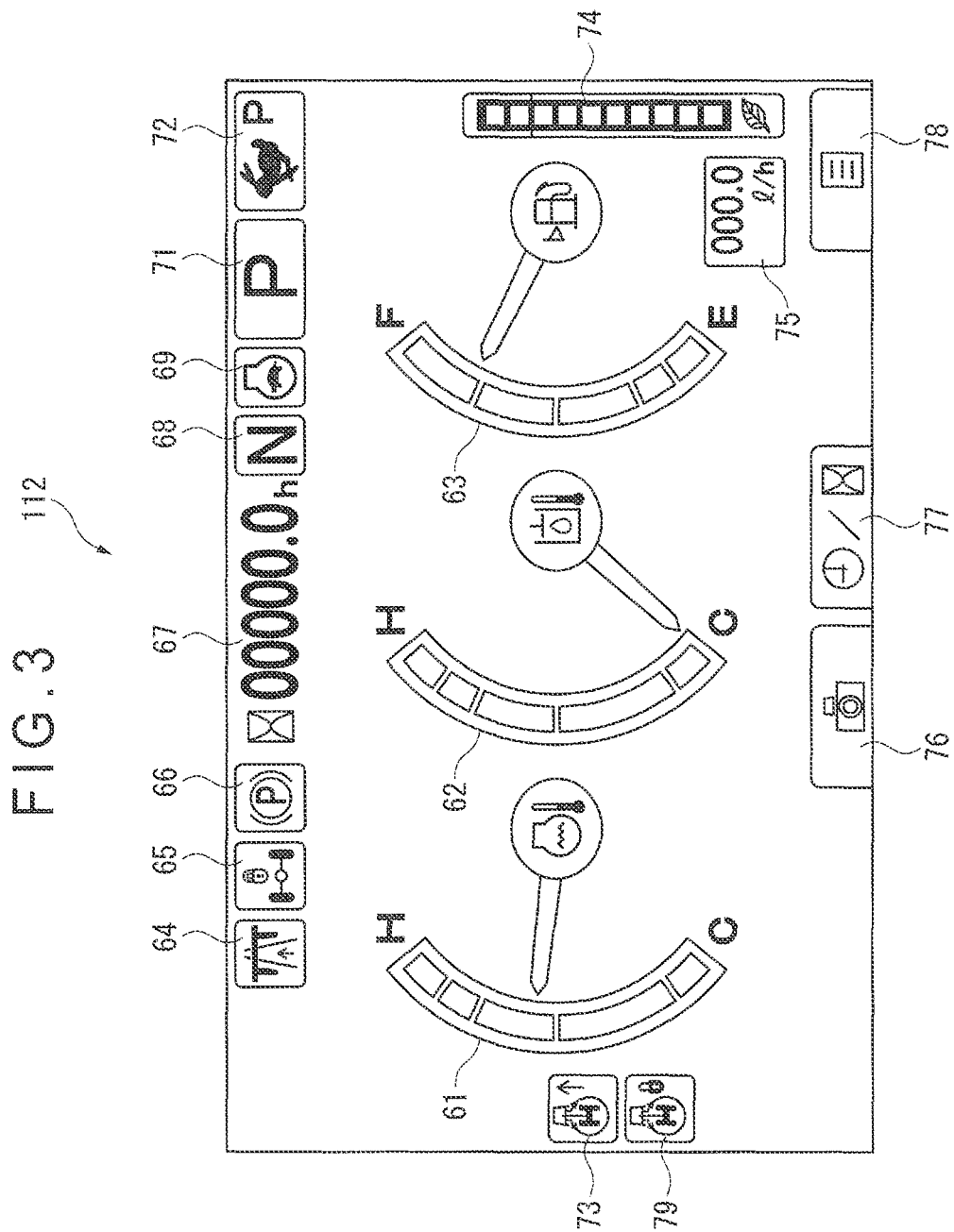
FIG. 3 is an illustration of a display screen of a display unit mounted in the work machine.

FIG. 3 shows an example of a display screen displayed on the display 112 of the multimonitor 53.

At the center of the display screen, a cooling-water temperature meter 61 that indicates a temperature of cooling water for cooling the engine 33, a hydraulic oil temperature meter 62 that indicates a temperature of hydraulic oil for actuating hydraulic devices such as the hydraulic pump 34, the hydraulic motors 22 and 36 (running motor 22, swing motor 36) and the hydraulic cylinder 44, and a fuel-level meter 63 that indicates a residual quantity of fuel are horizontally arranged and displayed in a large size.

Around the above meters 61, 62 and 63, specifically, at an upper part of the display screen, a street-mode indicator 64, a suspension lock-mode indicator 65, a parking brake indicator 66, a service meter 67, a speed stage indicator 68, an automatic deceleration indicator 69, a work-mode indicator 71 and a running-mode indicator 72 are displayed in a form of icons. Around the above meters 61, 62 and 63, specifically, at a left side of the display screen, a swing-position linear indicator 73 and a swing-lock indicator 79 are displayed in a form of icons. At a right side of the display screen, an eco gauge (fuel-consumption indicator) 74 that visually displays a relationship between an actual fuel consumption state and target fuel consumption and a numeral-display 75 that numerically displays fuel consumption per a unit time (average fuel consumption) are displayed. The eco gauge 74 will be detailed later.

The numerical value displayed on the numeral-display 75 will be described below. The data of fuel quantity indicated by the fuel injection command signal is received from the engine controller 52. Further, while the engine 33 is driven, a counter in the multimonitor 53 counts an engine operating time and a fuel-consumption arithmetic processor in an arithmetic section 116 calculates a value (l/h) indicating a cumulative fuel quantity divided by the engine operating time. The calculated numerical value (average fuel consumption) is sent via the display controller 113 to the display 112 to be updated and displayed thereon at a predetermined time interval. In other words, the numeral-display 75 displays the calculated average fuel consumption irrespective of the operation mode in which the hydraulic excavator 1 is operated. Accordingly, the numerical value displayed on the numeral-display 75 at the end of one-day work (work including travelling) represents the average fuel consumption of that day. When a predetermined time has elapsed after the engine 33 is stopped and it is judged that the next day has come, the numerical value is reset.

Figure 4:
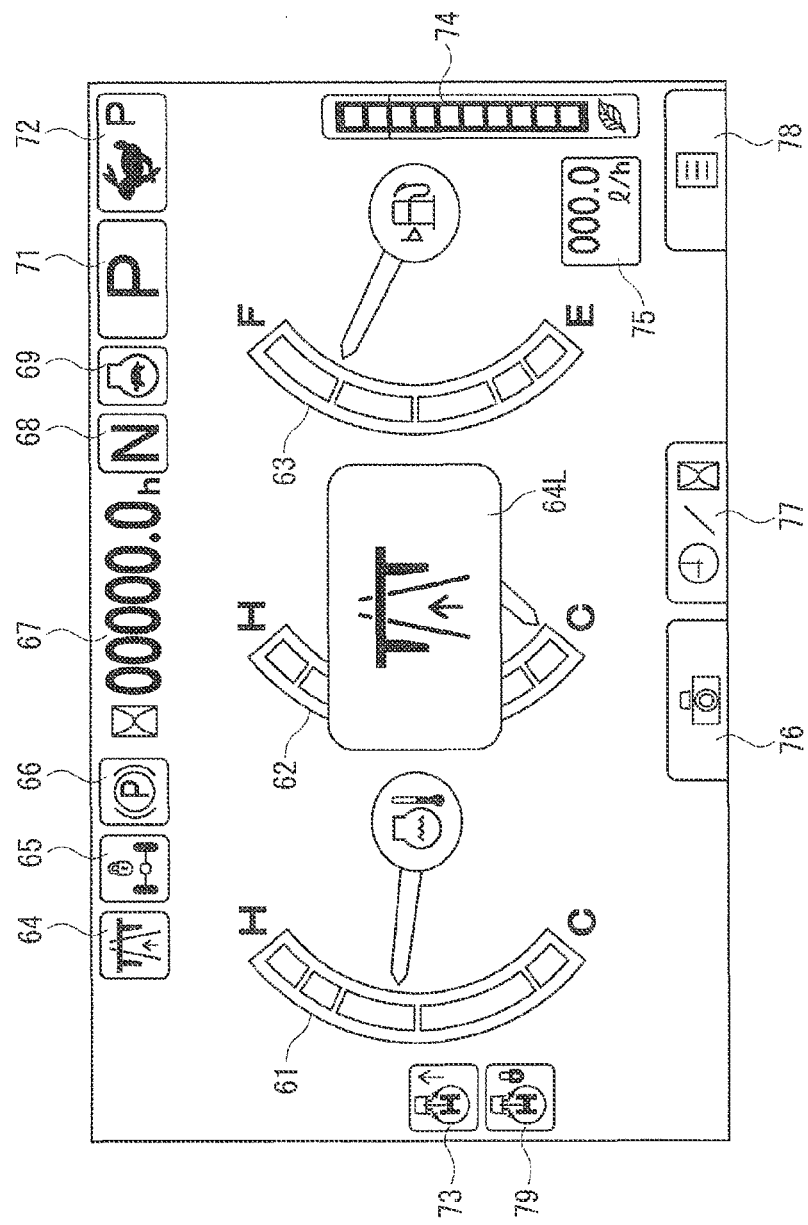
FIG. 4 is an illustration of the display screen of the display unit mounted in the work machine when it is commanded to switch to a street mode.

FIG. 4 shows the display 112 of the multimonitor 53 mounted in the hydraulic excavator 1 when it is commanded to switch to the street mode. While the operation mode of the hydraulic excavator 1 is the work mode and the display screen shown in FIG. 3 is displayed, when an operator operates the street-mode changeover switch 131 shown in FIG. 5, an operation signal is sent from the manipulating portion 114 to the operation controller 115. Then, a street-mode icon 64L indicating that the operation mode of the hydraulic excavator 1 is switched from the work mode to the street mode is displayed at the center of the display 112 in a large size. Incidentally, other icon(s) or message(s) may be displayed on the display 112 without displaying the street-mode icon 64L on the display 112 to notify an operator that the hydraulic excavator 1 cannot immediately travel even after being switched to the street mode by operating the street-mode changeover switch 131, unless (as described above or later) appropriate conditions of the hydraulic excavator 1 (swing lock condition (swing lock or swing free), suspension lock condition (suspension lock or suspension free), working equipment lock condition (working equipment lock or working equipment free) or travel-stop condition) are not met when travelling. The notification to an operator on availability on switching to the street mode is made because, unless: the upper swing body 3 is straight to a travel direction; the up-and-down extension and retraction of the suspension cylinders 26 are enabled (suspension free); and the operation of the working equipment 4 and the swing motion of the upper swing body 3 are restricted (working equipment lock, swing lock), there will be trouble for travelling the hydraulic excavator 1. Incidentally, the street-mode icon 64L is turned off after being lighted for, for instance, two seconds, and a display color of the street-mode indicator 64 is changed. The display controller 113 changes the display format of the display 112 in response to a predetermined signal from the operation controller 115 or the main controller 51. An operator can recognize whether the operation mode is switched to the street mode or not by checking the display color of the street-mode indicator 64.

Similarly, the display colors of respective icons of the suspension lock-mode indicator 65, the swing-position linear indicator 73 and the swing-lock indicator 79 displayed on the display 112 are switched in accordance with operations on the respective switches on the manipulating portion 114. Thus, an operator can recognize whether the suspension cylinders 26 could be locked (suspension lock) or freed (suspension free) by inspecting the suspension lock-mode indicator 65. Further, an operator can recognize whether the swing position of the upper swing body 3 is straight to the travel direction or not by inspecting the swing-lock indicator 79. By inspecting the display format of the respective indicators as described above, an operator can check whether the conditions for switching to the street mode are met or not (described in detail later). Further, for the sake of safety, when the street-mode indicator 64 is displayed in a format indicating the street mode but the swing lock is not enabled (when the swing position of the upper swing body 3 is not straight relative to the travel direction), a caution (character(s) or mark(s)) are displayed to prompt an operator to conduct the swing motion.

On the other hand, a plurality of switches operating simultaneously with the display of each of the indicators are provided on the manipulating portion 114 shown in FIG. 5. Specifically, a street-mode changeover switch 131, a suspension-lock-mode changeover switch 132, an automatic deceleration changeover command switch 133, a work mode changeover command switch 134, a running mode changeover switch 135, a buzzer cancel switch 136 and, though not described in detail, various switches for operating an air conditioner and the like are provided on the manipulating portion 114. The display color and/or display contents of the icon(s) displayed on the display screen are changed in accordance with the operation on each of the switches.

Various guidance icons as described below are displayed around the above meters 61, 62 and 63 (specifically at a lower part of the display screen). Function switches (not shown) for effecting the functions corresponding to each of the guidance icons are disposed at a lower side of the displayed area of the various guidance icons. Incidentally, when the display 112 and the manipulating portion 114 are separated (i.e. when the display 112 is disposed at an easily viewable part at the front side of the operator's seat on which an operator is seated and the manipulating portion 114 is disposed at a right or left side of the operator's seat within an easy reach of the operator), the various guidance icons and the function switches for effecting the function of the various guidance icons displayed on the display 112 may alternatively be provided on the manipulating portion 114. When the function switches are provided on the manipulating portion 114, the various guidance icons and the function switches are mutually associated with a spacially separated positional relationship.

Next, the functions of the various guidance icons displayed on the display 112 will be described below. When a car-mounted camera including one or more CCD cameras or the like is disposed on, for instance, an upper part of the counterweight in order to visually recognize a rear view of the hydraulic excavator 1, the rear view image of the hydraulic excavator 1 imaged by the car-mounted camera may be displayed on the display 112. In order to command switching the rear view image with the display screen shown in FIG. 3, an image-switching icon 76 is displayed as one of the guidance icons. In addition, a display-switching icon 77 for commanding switching of the service meter 67 and a clock display, a user-mode icon 78 for transition from the display screen shown in FIG. 3 to a display screen (not illustrated) for inputting various setting, and the like are displayed as the guidance icons.

The eco gauge 74 will be described in detail below with reference to FIGS. 6 to 8.

Figure 6:
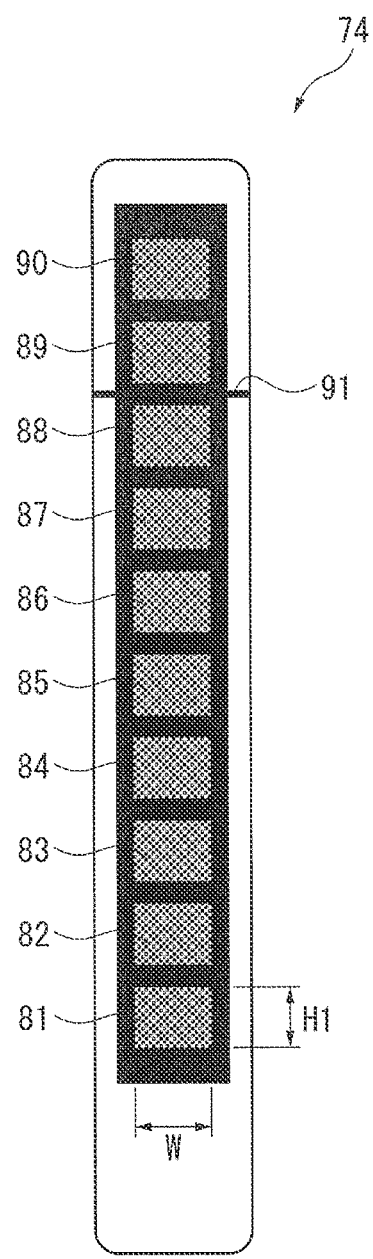
FIG. 6 is an illustration showing a fuel-consumption indicator displayed in the display screen.

FIG. 6 shows the eco gauge 74 on which the status of fuel consumption is not displayed. The eco gauge 74 displays the fuel consumption in a bar display on a real-time basis. The length of the bar indicates the quantity of the consumed fuel. The bar display is provided by ten blocks 81 to 90 (from a first block 81 to a tenth block 90) vertically arranged on a right end of the display 112. Specifically, in order to show the status of fuel consumption, the display range of the quantity of consumed fuel is divided in ten stages. Though the ten blocks 81 to 90 are shown in this exemplary embodiment, the number of the blocks may be increased in order to more minutely display the status of fuel consumption. The larger number of blocks 81 to 90 displayed in a predetermined color (i.e. the longer length of the bar) indicates larger fuel consumption (i.e. more fuel is consumed). The blocks 81 to 90 in the bar display indicating the level of fuel consumption may be constantly lighted or, alternatively, may be flashed per a predetermined time interval. The constant lighting and the flashing can be set as desired by operating a predetermined switch on the manipulating portion 114 by an operator or a serviceman. A target fuel-consumption line 91 indicating a level corresponding to target fuel consumption is displayed on the eco gauge 74 so as to allow an operator to easily visually check whether the actual fuel consumption comes within the target fuel consumption. Specific control content of the bar display, determining method of the target fuel-consumption line 91 and the like will be detailed later.

When the length of the bar of the bar display indicating the level of fuel consumption exceeds the length corresponding to the target fuel consumption because of large fuel consumption per a unit time, the part of the bar display exceeding the target fuel consumption is flashed or lighted in a color different from the part of the bar less than the target fuel consumption. In the figures, the blocks from the first block 81 located at the lowest part of the eco gauge 74 to the eighth block 88 located above are lighted or flashed in, for instance, green, while the ninth block 89 and the tenth block 90 are lighted or flashed in a color different from that of the rest of eight blocks 81 to 88 (e.g. in orange). In other words, the display format of the blocks is changed at the target fuel-consumption line 91. The block(s) above the target fuel-consumption line 91 (in FIG. 6, the blocks 89 and 90) may be constantly displayed or flashed. However, in order to effectively notify the large fuel consumption to an operator, the block(s) is preferably flashed.

Figure 7:
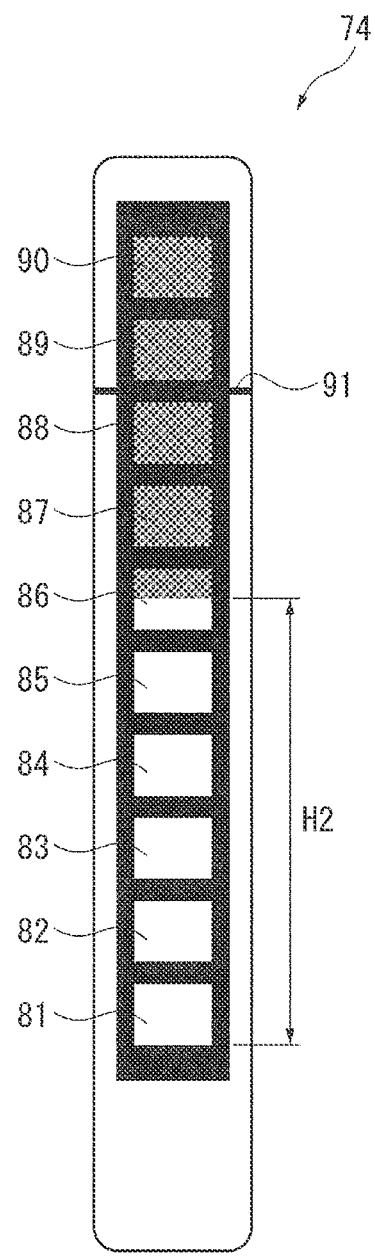
FIG. 7 is an illustration of the fuel-consumption indicator in a display state showing fuel consumption is within target fuel consumption.
Figure 8:
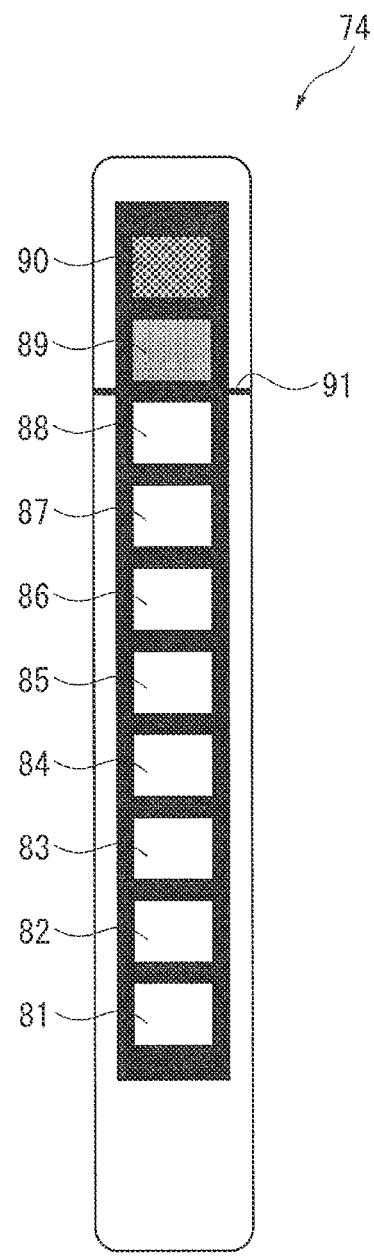
FIG. 8 is an illustration of the fuel-consumption indicator in a display state showing fuel consumption exceeding the target fuel consumption.

FIG. 7 shows the eco gauge 74 in which the blocks from the first block 81 to (a part of) the sixth block 86 are constantly lighted or flashed in green. In other words, this display status of the eco gauge 74 indicates that the actual fuel consumption is within the range of the target fuel consumption. When the quantity of consumed fuel per a unit time increases (i.e. when the fuel consumption increases) from the state shown in FIG. 7, the number of blocks that are constantly lighted or flashed increases. As shown in FIG. 8, the ninth block 89 (the ninth from the bottom of the eco gauge 74) flashed in orange indicates that the actual fuel consumption exceeds the target fuel consumption. As described above, the target fuel-consumption line 91 indicating the level corresponding to the target fuel consumption is displayed on the eco gauge 74 so as to allow an operator to easily visually check whether the actual fuel consumption comes within the target fuel consumption.

Since the display 112 is provided by a liquid crystal monitor, each of the blocks 81 to 90 are provided with a number of dots arranged in a matrix. Vertical display width in the gauge display is determined by a stack of a plurality of rows of dots. In other words, the number of stacked rows of dots varies in accordance with the later-described fuel consumption status so that the vertical display width of the bar display stretches and contracts in the vertical direction. The vertical display width displayable by each of the blocks 81 to 90 is a vertical display width H1 shown in FIG. 6. Also, a plurality of horizontally-arranged dots define a horizontal display width W for displaying the blocks 81 to 90. In other words, the eco gauge 74 of this exemplary embodiment displays the fuel consumption status in the bar display with a minimum unit of one row of dots and the eco gauge 74 vertically stretches or contracts the bar display in accordance with the fuel consumption status. Such an arrangement allows the partial display of the sixth block 86 as in the vertical display width H2 shown in FIG. 7.

The value of the target fuel consumption differs between the work mode in which a work is performed by the working equipment 4 and the street mode in which the undercarriage 2 is used for travelling. Though the specific value is not specifically limited, the target fuel consumption in the work mode is preset at, for instance, 18 litter/hour (18 l/h) and the target fuel consumption in the street mode is preset at, for instance, 23 litter/hour (23 l/h). The target fuel consumption is a value equal to 80% of actual maximum fuel consumption in the respective operation modes that is obtained by experiments and the like. Alternatively, the value of the target fuel consumption may be defined and preset as maximum fuel consumption with the best gas mileage during the work or travel in the respective operation modes.

Next, specific arrangements of the main controller 51 and the multimonitor 53 related to the display of the eco gauge 74 and control processes performed by the main controller 51 and the multimonitor 53 will be described below with reference to FIGS. 9, 10 and 11.

As shown in FIG. 9, the main controller 51 includes the communication control section 101, a state acquisition section 102, a mode determining section 103 and a solenoid control section 104.

The communication control section 101 serves for sending the information and data stored in the main controller 51 to the in-vehicle network NW and for receiving the information and data sent by the engine controller 52 and the multimonitor 53 via the in-vehicle network NW.

The state acquisition section 102 detects a current relative position (swing position) of the upper swing body 3 relative to the undercarriage 2 based on the detection signal from the swing-position sensor 57 provided near the swing circle and acquires the data indicating the travel speed detected by the vehicle speed sensor 58. Further, the state acquisition section 102 acquires a signal indicating a change request to the street mode based on the operation signal generated in accordance with an operation on the street-mode changeover switch 131 provided on the manipulating portion 114 of the multimonitor 53 and also acquires later-described information relating to the lock conditions of the working equipment 4 and the suspension in accordance with an operation signal generated in accordance with an operation on the suspension-lock-mode changeover switch 132 provided on the manipulating portion 114.

The mode determining section 103 determines whether the operation mode of the hydraulic excavator 1 is the street mode or the work mode based on the information and data acquired by the state acquisition section 102.

When the solenoid control section 104 receives the operation signal (the signal indicating a change from the work mode to the street mode) from the multimonitor 53 as described above, the solenoid control section 104 sends an electric signal (demagnetizing signal or magnetizing signal) to the PPC lock solenoid 54 to actuate the PPC lock valve 38. When the operation mode of the hydraulic excavator 1 is the work mode, a pilot hydraulic pressure in accordance with operation amount of the control lever is generated by operating the control lever (not shown) provided in the operator cab 31 for operating the working equipment 4. A control valve (not shown) receiving the pilot hydraulic pressure controls the flow rate of the hydraulic oil to actuate the hydraulic cylinder 44. When the main controller 51 receives the operation signal (a signal indicating a change from the work mode to the street mode) from the multimonitor 53, the main controller 51 generates a signal (working equipment lock signal) for commanding locking of the working equipment 4 even when the control lever is operated. The solenoid control section 104 receiving the working equipment lock command signal sends an electric signal (demagnetizing signal or magnetizing signal) to the PPC lock solenoid 54. The PPC lock solenoid 54 actuates the PPC lock valve 38, whereby the flow of the hydraulic oil from the hydraulic pump 34 to the PPC valve (not shown) (pilot hydraulic pressure) is blocked. Thus, when the working equipment 4 is locked (working equipment lock), the working equipment 4 becomes immovable even when the control lever is operated.

Further, the solenoid control section 104 send an electric signal (demagnetizing signal or magnetizing signal) to the swing brake solenoid 56 when the solenoid control section 104 detects duration of a neutral condition for a predetermined time in which a control lever (not shown) for swinging the upper swing body 3 is not operated, thereby actuating braking motion of the swing brake 37 so as to apply swing brake (swing lock) so that the upper swing body 3 is not swung. Further, the solenoid control section 104 sends a signal (swing brake command signal) for locking the swing (swing lock) of the upper swing body 3 to the communication control section 101.

The solenoid control section 104 sends an electric signal (demagnetizing signal or magnetizing signal) to the suspension lock solenoid 55 in response to the operation signal on the suspension-lock-mode changeover switch 132. When the suspension-lock-mode changeover switch 132 is operated by an operator, the operation signal is sent to the main controller 51. When the operation signal commands the restriction of the up-and-down motion of the suspension cylinder 26 (suspension lock), the operation signal is sent to the solenoid control section 104 via the communication control section 101. Then, the solenoid control section 104 sends an electric signal (demagnetizing signal or magnetizing signal) to the suspension lock solenoid 55. The suspension lock solenoid 55 actuates the suspension lock valve 27 to restrict inflow/outflow of the hydraulic oil to the suspension cylinder 26 to restrict the vertical extension and retraction of the suspension cylinder 26 (suspension lock).

Figure 10:
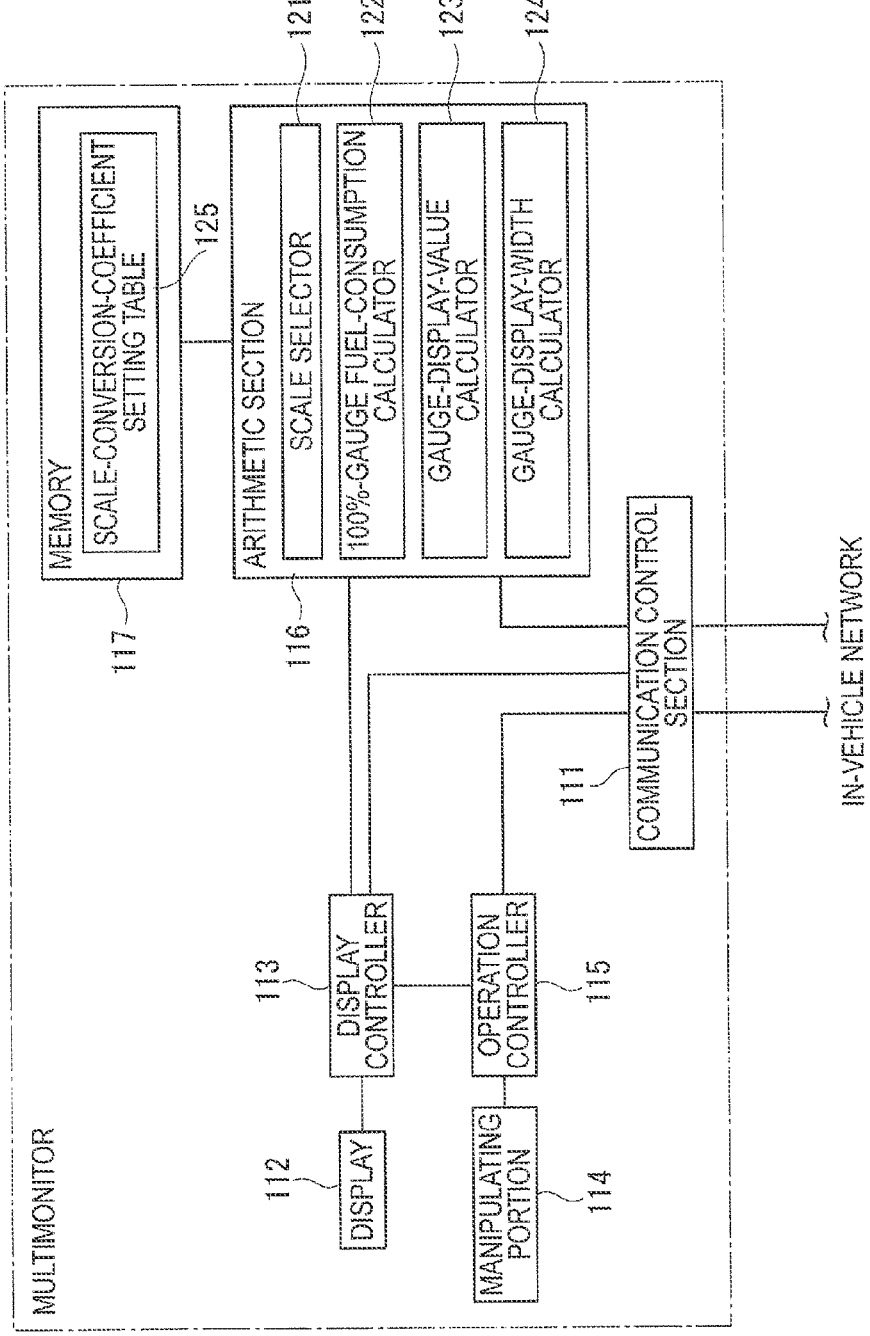
FIG. 10 is a block diagram showing an internal structure of the display unit.

FIG. 10 shows an internal structure of the multimonitor 53 (display unit). The multimonitor 53 includes a communication control section 111, the display 112, the display controller 113, the manipulating portion 114, the operation controller 115, the arithmetic section 116 and the memory 117. The arithmetic section 116 includes a scale selector 121, a 100%-gauge fuel-consumption calculator 122 (fuel-consumption calculator at full scale), a gauge-display-value calculator 123 and a gauge-display-width calculator 124.

The communication control section 111 serves for sending information and data stored in the multimonitor 53 or information and data set by the multimonitor 53 to the in-vehicle network NW and for receiving information and data outputted by the main controller 51 and the engine controller 52 via the in-vehicle network NW.

As described above, the display 112 is provided by a liquid crystal monitor and the like for displaying the display screen.

The display controller 113 includes a liquid crystal driver for performing display control on the liquid crystal monitor and the like. Specifically, the display controller 113 controls the display format of the eco gauge 74 based on a dot row number (gauge display width) calculated by the arithmetic section 116. Further, the display controller 113 receives an operation signal generated in accordance with an operation on various switches provided on the manipulating portion 114 via the operation controller 115 and controls the display on the respective indicators shown in FIG. 3 (the street-mode indicator 64, the suspension lock-mode indicator 65, the parking brake indicator 66, the service meter 67, the speed stage indicator 68, the automatic deceleration indicator 69, the work-mode indicator 71 and the running-mode indicator 72). In addition, the display controller 113 controls the display on the respective meters (the cooling-water temperature meter 61, the hydraulic oil temperature meter 62 and the fuel-level meter 63) based on the detection signals from the water-temperature sensor for detecting the temperature of the cooling-water of the engine 33, hydraulic-oil temperature sensor for detecting the temperature of the hydraulic oil and a fuel meter for detecting a residual quantity of fuel stored in a fuel tank.

As described above, the manipulating portion 114 is provided with the street-mode changeover switch 131, the suspension-lock-mode changeover switch 132, the automatic deceleration changeover command switch 133, the work mode changeover command switch 134, the running mode changeover command switch 135, the buzzer cancel switch 136, the working equipment lock switch and the like.

As described above, the operation controller 115 sends the operation signal generated in accordance with an operation on the various switches provided on the manipulating portion 114 to the display controller 113 or the communication control section 111 and outputs a signal indicating ON and OFF of a street-mode change request flag to the main controller 51 as detailed later.

The arithmetic section 116 of the multimonitor 53 will be described below in detail. The scale selector 121 of the arithmetic section 116 selects either one of the prestored values "1.0" and "0.8" as a scale conversion coefficient (described later). In the street mode, the value "1.0" is selected as the scale conversion coefficient while the value "0.8" is selected as the scale conversion coefficient in the work mode. The "0.8" scale conversion coefficient in the work mode is derived as follows. The scale conversion coefficient in the work mode is a value obtained by dividing the target fuel consumption 18 (l/h) in the work mode by the target fuel consumption in the street mode 23 (l/h) (18/23≈0.8). The scale conversion coefficients in the respective operation modes are used for calculating the fuel consumption (l/h) when the eco gauge 74 indicates the level of the fuel consumption at the maximum (full scale, 100% gauge). Incidentally, though the values of the target fuel consumption or the scale conversion coefficient in the respective operation modes are stored in advance in the storage such as the memory 117 and the like, the values can be updated by operating a predetermined switch on the manipulating portion 114 by an operator or a serviceman. This is because the hydraulic excavator 1 may travel mostly on city roads requiring frequent start and stop movement or may travel mostly on suburban roads requiring little start and stop movement depending on the location of a work site, where the target fuel consumption or the value of the scale conversion coefficient that may affect the gauge display on the eco gauge 74 may have to be changed.

The 100%-gauge fuel-consumption calculator 122 of the arithmetic section 116 calculates the fuel consumption corresponding to a fuel consumption value at the full scale of the eco gauge 74 in the respective operation modes on the basis of the target fuel consumption (23 (l/h)) during the street mode according to a formula (1) below. The fuel consumption value at the full scale is equivalent to the 100%-gauge fuel-consumption value, where the dots of all of the blocks 81 to 90 of the eco gauge 74 are lighted or flashed. Though percentage is used in this exemplary embodiment, the values used in the later-described formulae (2) and (3) represented by percentage refers to the ratio to the full scale (i.e. the value at the full scale is supposed to be 100).

100%-gauge fuel consumption value calculation=
(scale conversion coefficient×street-mode 80%
fuel consumption)×(100/80)  (1)

Herein, the street-mode 80% fuel consumption refers to an 80% value relative to the actual maximum fuel consumption calculated based on the fuel consumption obtained by experimentally travelling the hydraulic excavator 1 in the street mode as described above. Alternatively, the street-mode 80% fuel consumption may be defined and preset as maximum fuel consumption with the best gas mileage during the work or travel in the street mode. Specifically, the street-mode 80% fuel consumption is 23 (l/h) and is stored in the memory 117 and the like. The value of the street-mode 80% fuel consumption can also be changed by an operation on a predetermined switch of the manipulating portion 114 by an operator or a serviceman.

As described above, when the 100%-gauge fuel-consumption value is to be calculated, since the 100%-gauge fuel-consumption value in the respective operation modes can be calculated by the above single formula (formula (1)) on the basis of the target fuel consumption in the street mode (23 (l/h)) and further applying the scale conversion coefficient, separate formulae for the respective operation modes are not necessary, and the storage memory capacity required for arithmetic processing and the like can be efficiently utilized.

The gauge-display-value calculator 123 of the arithmetic section 116 calculates the percentage of the current fuel consumption relative to the 100%-gauge fuel-consumption value according to the formula (2) below based on an instant fuel consumption acquired from the engine controller 52. The current instant fuel consumption used in the formula (2) is calculated as follows. Initially, data indicating the instant fuel consumption for a predetermined cycle (e.g. 10 msec) is acquired from the engine controller 52 for a predetermined period (e.g. 3 seconds) and data groups indicating ever-changing instant fuel consumption are stored in the storage of the memory 117. Then, the gauge-display-value calculator 123 of the arithmetic section 116 calculates average fuel consumption for a predetermined time (e.g. past 3 seconds as described above) using the data groups indicating the instant fuel consumption stored for the predetermined time (e.g. past 3 seconds as described above) and assigning the calculated value (the instant fuel consumption calculated by the arithmetic section 116) in the formula (2) as the current instant fuel consumption (the instant fuel consumption calculated by the arithmetic section 116) to calculate the gauge display value.

Gauge display value calculation (in percentage)=(current instant fuel consumption (instant fuel consumption calculated by the arithmetic section 116)/100%-gauge fuel-consumption value)×100  (2)

The gauge display value calculation is performed per a predetermined cycle (e.g. 50 msec). Thus, the gauge display indicating the instant fuel consumption displayed on the eco gauge 74 is updated per the predetermined cycle (e.g. 50 msec). It should be understood that, as the predetermined cycle becomes short, the real-time displayability of the eco gauge 74 can be enhanced. Accordingly, the real-time displayability of the eco gauge 74 may be adjusted by changing the predetermined cycle by operating the manipulating portion 114 in a range restricted by the processing speed of an liquid crystal driver or the respective arithmetic processors (CPU) and the communication speed of the data communication.

The gauge-display-width calculator 124 of the arithmetic section 116 calculates how many dot rows the gauge display value calculated by the following formula (2) corresponds to be displayed by the eco gauge 74 according to the formula (3) below. Incidentally, the value of the dot width corresponding to a unit percent (%) is stored in the memory 117 in advance.

Gauge display width (dot) calculation=gauge display
value (%)×dot width relative to the unit percent
(%)  (3)

The memory 117 stores therein a scale-conversion-coefficient setting table 125 corresponding to each of the respective operation modes. The value of the scale conversion coefficient ("1.0" and "0.8") is stored in the scale-conversion-coefficient setting table 125. Further, the memory 117 stores therein one or more software (computer program) for operating the units 121 to 124 provided in the arithmetic section 116, the software being loaded by the arithmetic section 116 as necessary to be executed.

Incidentally, the target fuel consumption in the respective operation modes ("23 l/h", "18 l/h") may alternatively be incorporated in the program for operating the 100%-gauge fuel-consumption calculator 122 in a form of a parameter without reading out from the memory 117 each time the calculation is performed.

The fuel-consumption display process on the eco gauge 74 will be described below with reference to flowcharts shown in FIGS. 11 to 13.

Figure 11:
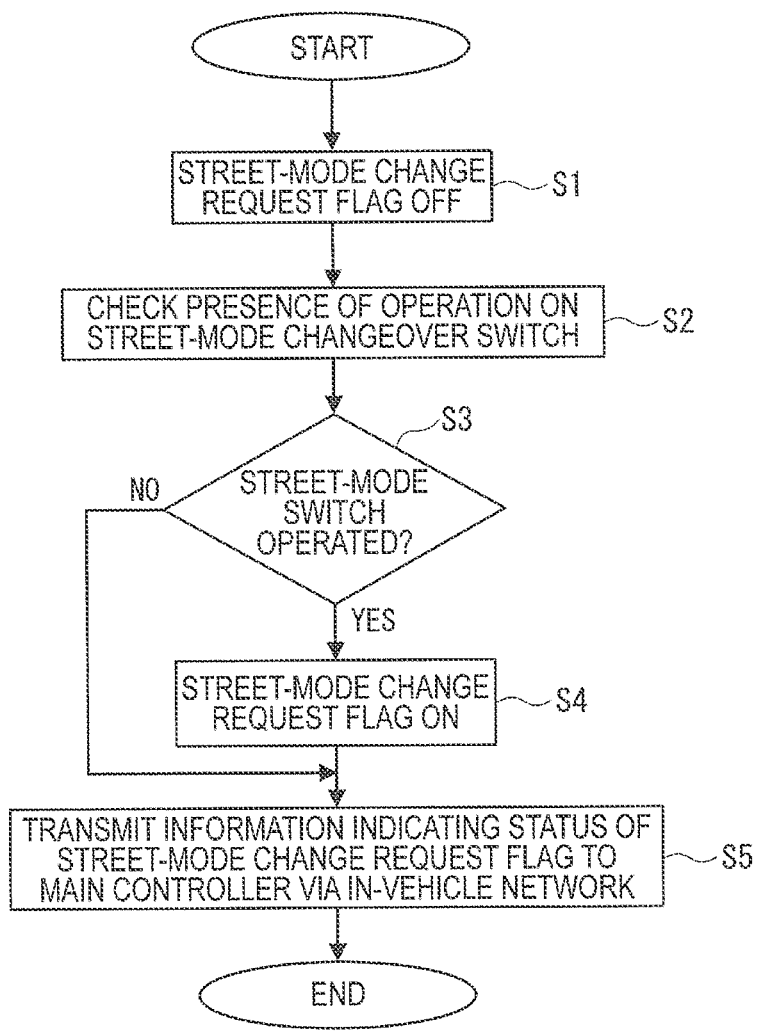
FIG. 11 is a first flow chart showing a control flow performed in the display unit.

As shown in FIG. 11, the operation controller 115 of the multimonitor 53 initially confirms that a street-mode change request flag indicates "OFF" (step 1: the step will be abbreviated as "S" hereinafter). The street-mode request change flag refers to a flag (a condition variable represented by 0 or 1) generated in accordance with an operating condition of the street-mode changeover switch 131 of the manipulating portion 114, whereby the operating condition of the street-mode changeover switch 131 is checked (S2). Next, whether the street-mode changeover switch 131 is operated or not is determined (S3). Incidentally, the flag refers to a condition variable represented by 0 or 1, where "ON" (a change request from the work mode to the street mode) is represented by 1 and "OFF" (a change request from the street mode to the work mode) is represented by 0. Instead, ON may be represented by 0 and OFF may be represented by 1.

When the street-mode changeover switch 131 of the manipulating portion 114 is operated and an operation signal is sent to the operation controller 115 (determination in S3: YES), the operation controller 115 switches the street-mode change request flag to "ON" (S4). Subsequently, information indicating the status of the street mode request change flag is sent to the main controller 51 through the communication control section 111 via the in-vehicle network NW (S5). When it is determined in S3 that the operation signal is not sent to the operation controller 115 from the manipulating portion 114 and the street-mode changeover switch 131 is not operated (determination in S3: NO), the operation controller 115 performs the process in S5, where the information indicating the status of the street-mode change request flag is sent to the main controller 51 through the communication control section 111 via the in-vehicle network NW (S5).

Figure 12:
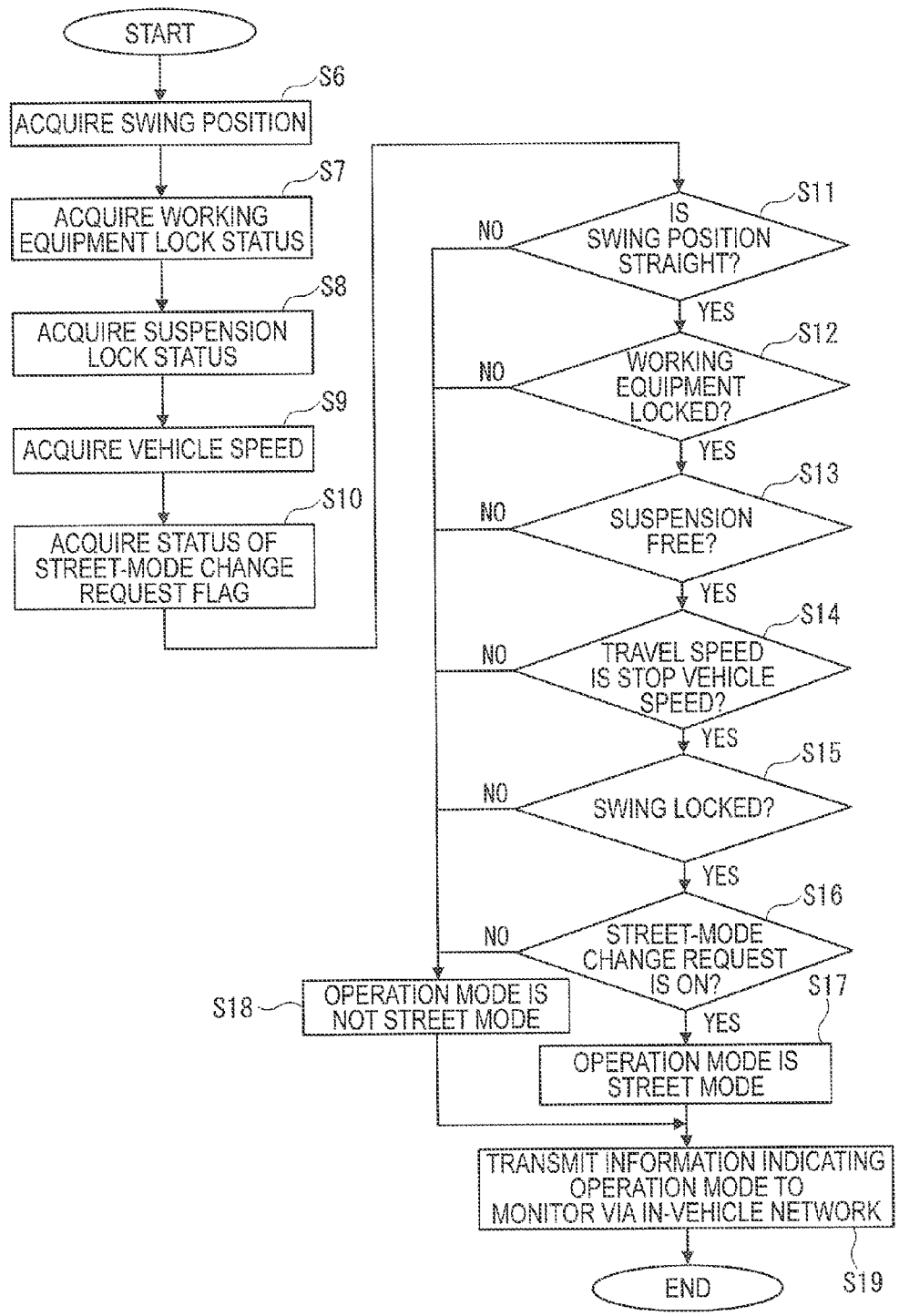
FIG. 12 is a flow chart showing a control flow of a control operation performed by the control unit.
Figure 13:
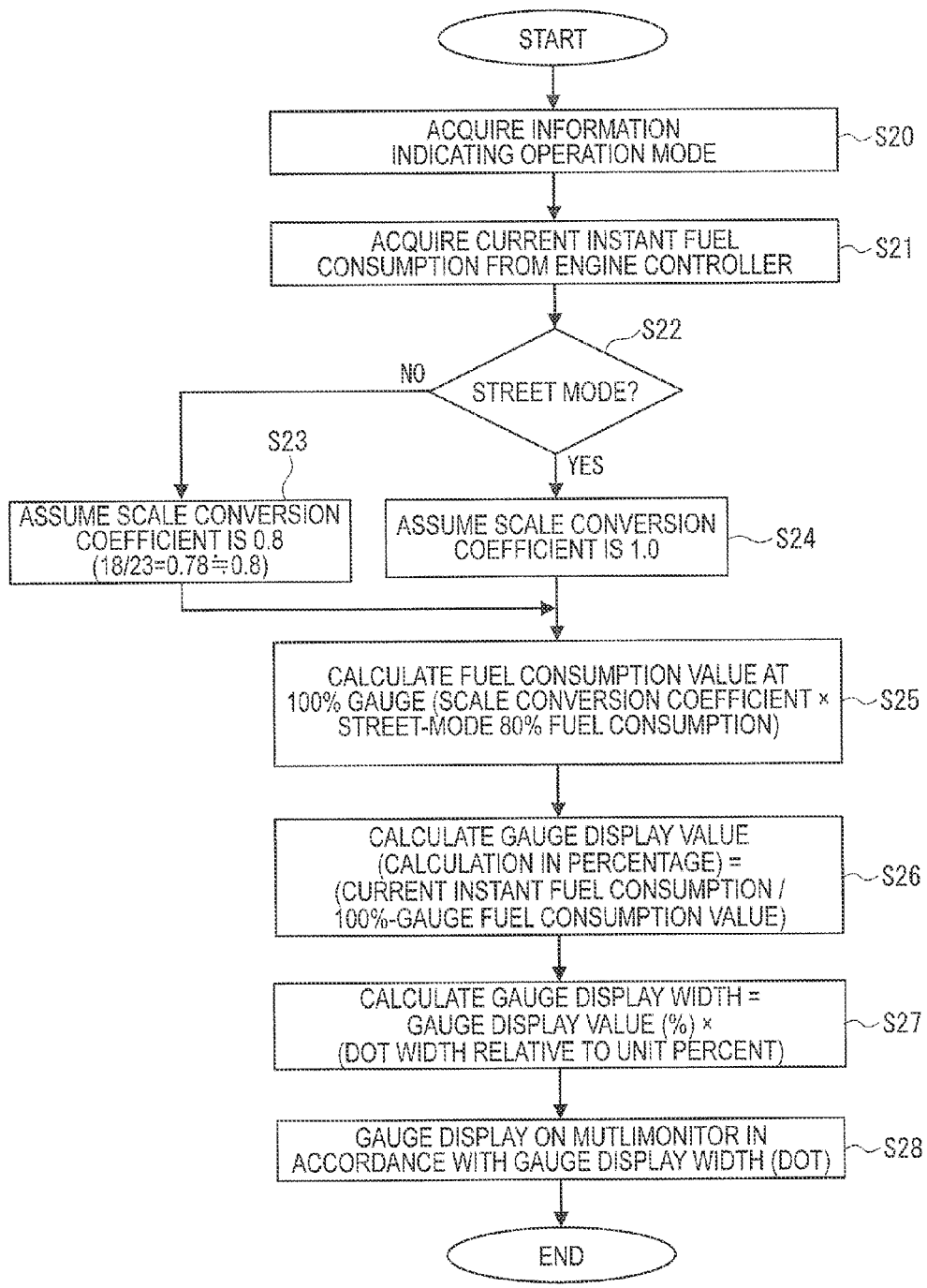
FIG. 13 is a second flow chart showing a control flow performed by the display unit.

On the other hand, as shown in FIG. 12, the state acquisition section 102 of the main controller 51 acquires information representing the position of the upper swing body 3 in the swing direction based on the detection signal from the swing-position sensor 57 (S6). In addition, the solenoid control section 104 acquires the information indicating a lock status of the working equipment 4 (whether the working equipment 4 is in the working equipment lock or working equipment free) and the information indicating the suspension lock status of the suspension cylinder 26 (whether the suspension cylinder 26 is in suspension lock or suspension free) received from an outside (S7, S8). Further, the data indicating a current travel speed of the hydraulic excavator 1 is acquired from the vehicle speed sensor 58 (S9). Then, the information indicating the status of the street-mode change request flag (ON or OFF) is acquired from the multimonitor 53 via the in-vehicle network NW and the communication control section 101 (S10). It should be understood that the sequence of S6 to S10 may be altered for acquiring the information instead of the order shown in FIG. 12.

The mode determining section 103 determines whether the swing position of the upper swing body 3 is straight to the travel direction or not based on the information indicating the position of the upper swing body 3 in the swing direction obtained in S6 (S11). In S11, whether the orientation of the upper swing body 3 in the front-back direction coincides with the front-back direction of the undercarriage 2 or not is determined. When a front direction (front being defined as a side on which the working equipment 4 is supported) of the upper swing body 3 and a direction for the advancement of the undercarriage 2 coincide, it is determined that the upper swing body 3 is straight to the travel direction (S11: YES). In other words, that the upper swing body 3 is straight to the travel direction (S11: YES) means the operator faces in the advancement direction relative to the advancement travel direction of the hydraulic excavator 1 and the upper swing body 3 is situated at a position where no trouble on travel operations or safety is caused in traveling the hydraulic excavator 1.

Next, based on the information indicating whether the operation of the working equipment 4 is locked or not obtained in S7, whether the working equipment 4 is in the state of the working equipment lock or the working equipment free is determined (S12). When the information indicates the working equipment lock (S12: YES), the process advances to S13. The working equipment lock state (S12: YES) means that the working equipment 4 is disabled when the operator operates the control lever (not shown) for operating the working equipment 4, so that no trouble on the travel operation or safety is caused when the operator moves the hydraulic excavator 1.

Based on the information indicating whether the operation of the suspension cylinder 26 is locked or not obtained in S8, whether the suspension cylinder 26 is in the state of the suspension cylinder lock or the suspension cylinder free is determined (S13). When the information indicates the suspension free (S13: YES), the process advances to S14. The suspension free state (S13: YES) means that the extension and retraction of the suspension cylinders 26 are not restricted (locked) so that the operator does not feel uncomfortable while the hydraulic excavator 1 is travelling.

Based on the data indicating the current travel speed of the hydraulic excavator 1 obtained in S9, whether the current travel speed of the hydraulic excavator 1 indicates that the hydraulic excavator 1 is stopped or not (whether the travel speed is less than or equal to a predetermined travel speed or not) is determined (S14). When the information indicates that the hydraulic excavator 1 is stopped (S14: YES), the process advances to S15. Whether the travel speed indicates that the hydraulic excavator 1 is stopped or not is determined so that, by allowing the switching between the street mode and the work mode only when the hydraulic excavator 1 is stopped, a safety check by the operator is securely performed for switching the operation modes.

The state acquisition section 102 acquires the information indicating which one of the demagnetizing signal and the magnetizing signal to the swing brake solenoid 56 is generated by the main controller 51 in response to the predetermined signal to determine whether the upper swing body 3 is in the state of swing lock or the swing free (S15). When the information indicates the swing lock (S15: YES), the process advances to S16. The swing lock state (S15: YES) means that the upper swing body 3 is unable to swing so as not to cause a trouble on travel operation or safety in travelling the hydraulic excavator 1. The swing lock is kept while the hydraulic excavator 1 travels after starting travelling in the street mode until the street-mode changeover switch 131 is operated to make a change request to the work mode after stopping the travel.

Based on the information indicating the street-mode change request flag (ON or OFF) obtained in S10, whether or not the street-mode changeover switch 131 is operated by the operator and the change request from the work mode to the street mode has been made is determined (S16). When the information indicates that the street-mode change request flag is ON suggesting that street-mode changeover switch 131 is operated to request a change from the work mode to the street mode (S16: YES), the process advances to S17.

When all of the above determinations made in S11 to S16 are YES, it is determined that the conditions for traveling the hydraulic excavator 1 are met and it is appropriate to set the operation mode of the hydraulic excavator 1 to the street mode, whereby the operation mode is set to the street mode (S17). On the other hand, when at least one of the determinations made in S11 to S16 is NO, it is determined that it is not appropriate to set the operation mode of the hydraulic excavator 1 to the street mode, whereby the operation mode is not set to the street mode (S18). The order of the processes in S11 to S16 may be altered instead of the order shown in FIG. 12. The information indicating the operation mode set in S17 or S18 is stored in storage such as a memory (not shown) in the main controller 51.

Subsequently, the mode determining section 103 reads out the information indicating the operation mode from the storage and sends the information indicating the operation mode to the multimonitor 53 via the communication control section 101 and the in-vehicle network NW (S19).

Next, the control process in the multimonitor 53 (display unit) will be described below with reference to the control flow shown in FIG. 13. Initially, the arithmetic section 116 of the multimonitor 53 acquires the information indicating the operation mode of the hydraulic excavator 1 from the main controller 51 via the in-vehicle network NW and the communication control section 111 (S20). Further, the arithmetic section 116 acquires the data of the current instant fuel consumption from the engine controller 52 (S21). Then, the arithmetic section 116 determines from the information indicating the operation mode obtained in S20 whether the operation mode currently set for the hydraulic excavator 1 is the street mode or not (S22).

When it is determined in S22 that the operation mode of the hydraulic excavator 1 is the street mode (S22: YES), the process advances to S24, where the scale selector 121 of the arithmetic section 116 reads out "1.0" as the scale conversion coefficient from the scale-conversion-coefficient setting table 125 in the memory 117 (S24). On the other hand, when it is determined in S22 that the operation mode of the hydraulic excavator 1 is not the street mode (S22: NO), the process advances to S23, where the scale selector 121 of the arithmetic section 116 reads out "0.8" as the scale conversion coefficient from the scale-conversion-coefficient setting table 125 in the memory 117 (S23).

Next, the 100%-gauge fuel-consumption calculator 122 of the arithmetic section 116 calculates the 100%-gauge fuel-consumption value from the street-mode 80% fuel consumption and the scale conversion coefficient in the respective modes in accordance with the above formula (1). The scale conversion coefficients of one of the operation modes corresponding to the operation mode determined in S22 and read out in S23 or S24 is used (S25).

Next, the gauge-display-value calculator 123 uses the 100%-gauge fuel-consumption value calculated in S25 to calculate the gauge display value (i.e. the average fuel consumption calculated based on the data group representing the instant fuel consumption accumulated in the predetermined period) as the current instant fuel consumption, and calculates the percentage of the current instant fuel consumption (the instant fuel consumption calculated by the arithmetic section 116) relative to the 100%-gauge fuel-consumption value (S26).

Subsequently, the gauge-display-width calculator 124 calculates the number of dot rows (gauge display width) to be occupied by the gauge display value (%) obtained in S26 when being displayed on the eco gauge 74 as the status of fuel consumption in accordance with the above formula (3) (S27). The dot width relative to the percentage (%) used herein means the numerical value of the dot width per a unit percent that is preset in advance, which is stored in the memory 117 and is read out when the process in S27 is to be performed. The numerical value of the dot width per a unit percent may be configured to be variable by a predetermined operation on the manipulating portion 114 of the multimonitor 53 by a serviceman. By changing the numerical value of the dot width per a unit percent, the gauge displayed on the eco gauge 74 can be greatly fluctuated in accordance with the change in fuel consumption or, conversely, the gauge displayed on the eco gauge 74 can be less sensitively fluctuated in spite of the change in fuel consumption, whereby the sensitivity of the gauge relative to the fuel consumption can be adjusted. Lastly, the display controller 113 receives the data indicating the calculated gauge display width from the gauge-display-width calculator 124 and displays the fuel consumption status on the eco gauge 74 of the display 112 of the multimonitor 53 in color in accordance with the corresponding number of rows of dots (S28).

As described above, the position of the target fuel-consumption line 91 displayed on the eco gauge 74 in the respective operation modes stays constant irrespective of the switching of the operation modes. With the use of "1.0" scale conversion coefficient in the street mode, the target fuel-consumption line 91 displayed on the eco gauge 74 can be associated with the target fuel consumption value in the street mode (i.e. 23 (l/h)). Alternatively, with the use of "0.8" scale conversion coefficient in the work mode, the target fuel consumption value in the street mode can be converted into the target fuel consumption value in the work mode and the target fuel-consumption line 91 displayed on the eco gauge 74 can be associated with the target fuel consumption value in the work mode (i.e. 18 (l/h)).

Since the 100%-gauge fuel-consumption values in the respective operation modes are calculated using the target fuel consumption corresponding to each of the operation modes for calculating the ratio of the current instant fuel consumption relative to the 100%-gauge fuel-consumption value and the fuel consumption is displayed based on the ratio, the display format of the eco gauge 74 (e.g. constantly lighting or flashing the first to eighth blocks 81 to 88 when the current fuel consumption is at the level of the target fuel-consumption line 91 or less than the target fuel consumption, or the ninth and tenth blocks 89 and 90 are flashed when the current fuel consumption exceeds the target fuel consumption) can be made common to the respective operation modes, whereby the fuel consumption status in the respective operation modes can be appropriately displayed in an easily recognizable manner with the single eco gauge 74. In other words, the operator can determine the efficiency/inefficiency of fuel consumption status due to the operator's own operation irrespective of the operation modes (i.e. travelling in the street mode or working in the work mode) in view of the eco gauge 74 represented by a single display format and can attempt to perform a low-fuel-consumption operation (i.e. avoids excessive push on an accelerator (not shown) and operations of the working equipment 4 unnecessary for specific works when the current fuel consumption exceeds the target fuel-consumption line 91).

Incidentally, it should be understood that the scope of the invention is not limited to the above-described exemplary embodiment(s) but includes modifications and improvements as long as the modifications and improvements are compatible with an object of the invention.

For instance, though the 100%-gauge fuel-consumption value in the respective operation modes is calculated based on 80% fuel-consumption during the street mode in the above exemplary embodiment, the 100%-gauge fuel-consumption value may be calculated based on the 80% fuel-consumption during the work mode. In such an arrangement, the scale conversion coefficient in the work mode is set at 1.0, and the scale conversion coefficient in the street mode is set at 1.25=1.0/0.8.

Alternatively, without using the scale conversion coefficient, the 100% fuel consumption value in the respective operation modes may be separately calculated based on 80% fuel consumption of each of the operation modes. However, such an arrangement entails increase in the number of computation formulae, complicated arithmetic processing and a large memory capacity. Thus, it is preferable that the 80% fuel consumption in one of the operation modes and the scale conversion coefficient set for the respective operation modes are used as in the above exemplary embodiment and the above modification.

Though the main controller 51 acquires the data indicating the travel speed of the hydraulic excavator 1 from the vehicle speed sensor 58 and uses the data to determine whether the current operation mode of the hydraulic excavator 1 is the street mode or not in the above exemplary embodiment, the data from the vehicle speed sensor 58 is not requisite for determining the modes but can be omitted. Specifically, the hydraulic excavator 1 may perform a work accompanying a travel at an extremely low speed and may go on to a travel operation as an extension of the low-speed travelling. Thus, it is not necessary that the travel speed indicates a stop speed when the operation mode is to be determined. However, when the switching to the street mode is commanded and the travel speed of the hydraulic excavator 1 is less than a predetermined speed (but is not stopped) or when the travel speed of the hydraulic excavator 1 exceeds a predetermined speed, a predetermined caution (in a character or a mark) is displayed on the display 112. Specifically, a message, an exclamation mark or the like for prompting an operator to safely stop the hydraulic excavator 1 before performing various operations for enhancing safety is displayed on the display 112.

Figure 14:
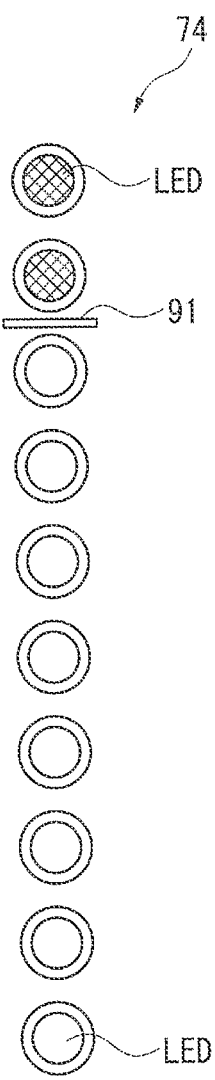
FIG. 14 illustrates a first modification of the invention.
Figure 15:
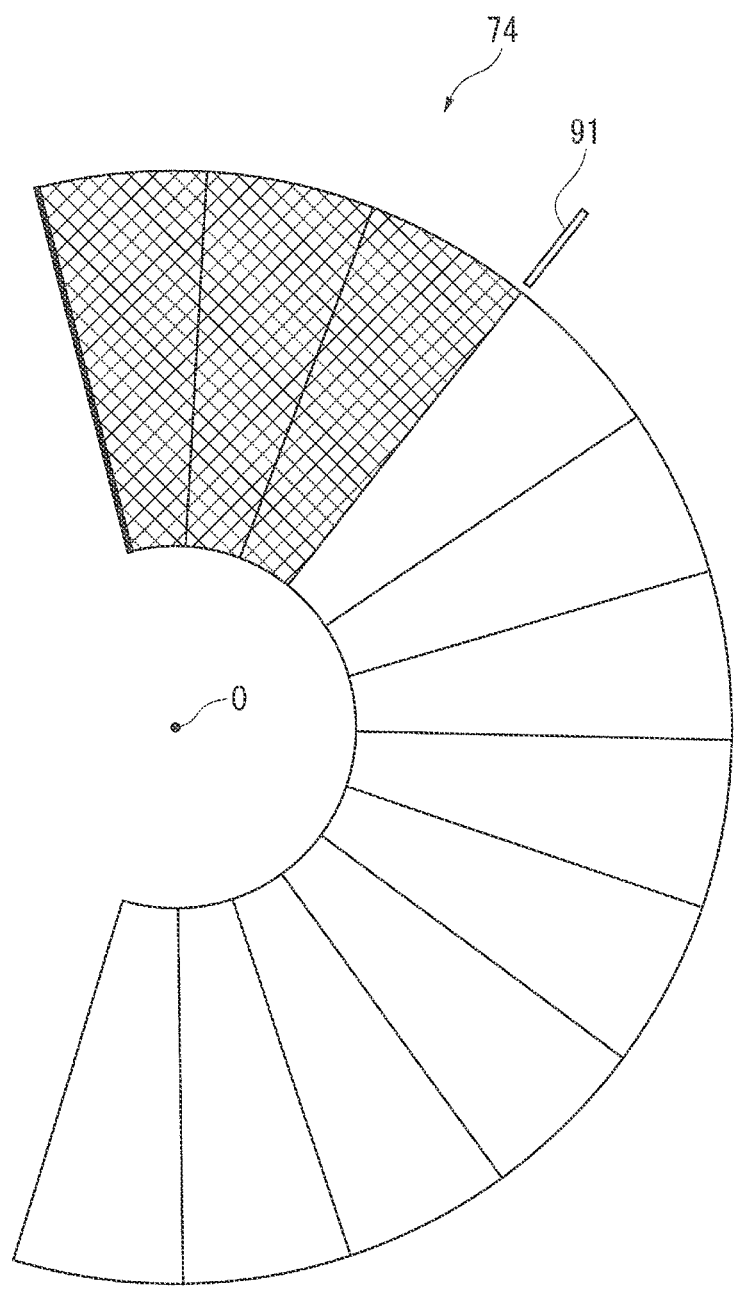
FIG. 15 illustrates a second modification of the invention.

Though the eco gauge 74 in the above exemplary embodiment is provided by a bar display on the display 112 (liquid crystal monitor) using the plurality of blocks 81 to 90, the eco gauge 74 may be provided by a plurality of LEDs as shown in a first modification shown in FIG. 14. In this first modification, the target fuel-consumption line 91 is also lighted by LED, where the number of LEDs to be constantly lighted or flashed is increased or decreased in accordance with the level of the current fuel consumption and, when the level of fuel consumption exceeds the target fuel-consumption line 91, the LED indicating the exceeded fuel consumption is lighted in a color different from the emission color of the rest of LEDs. Further, only the LED indicating the fuel consumption in excess may be flashed to clearly notify the operator that the fuel consumption is not favorable. Alternatively, as shown in FIG. 15 as a second modification, the eco gauge 74 may be provided by a plurality of fan-shaped blocks. In this arrangement, the display 112 (liquid crystal monitor) is divided into a plurality of fan-shaped blocks and the number of blocks lighted or flashed changes in accordance with the level of the fuel consumption. Specifically, the target fuel-consumption line 91 is displayed as shown in FIG. 15, where the level of the fuel consumption is indicated by the number of blocks lighted or flashed anticlockwise around a center O (which is not displayed in itself). In the above arrangement, the fuel consumption exceeding the target fuel-consumption line 91 is also shown by lighting or flashing the block(s) indicating the fuel consumption in excess by a color different from that of the rest of the blocks.

Figure 16:
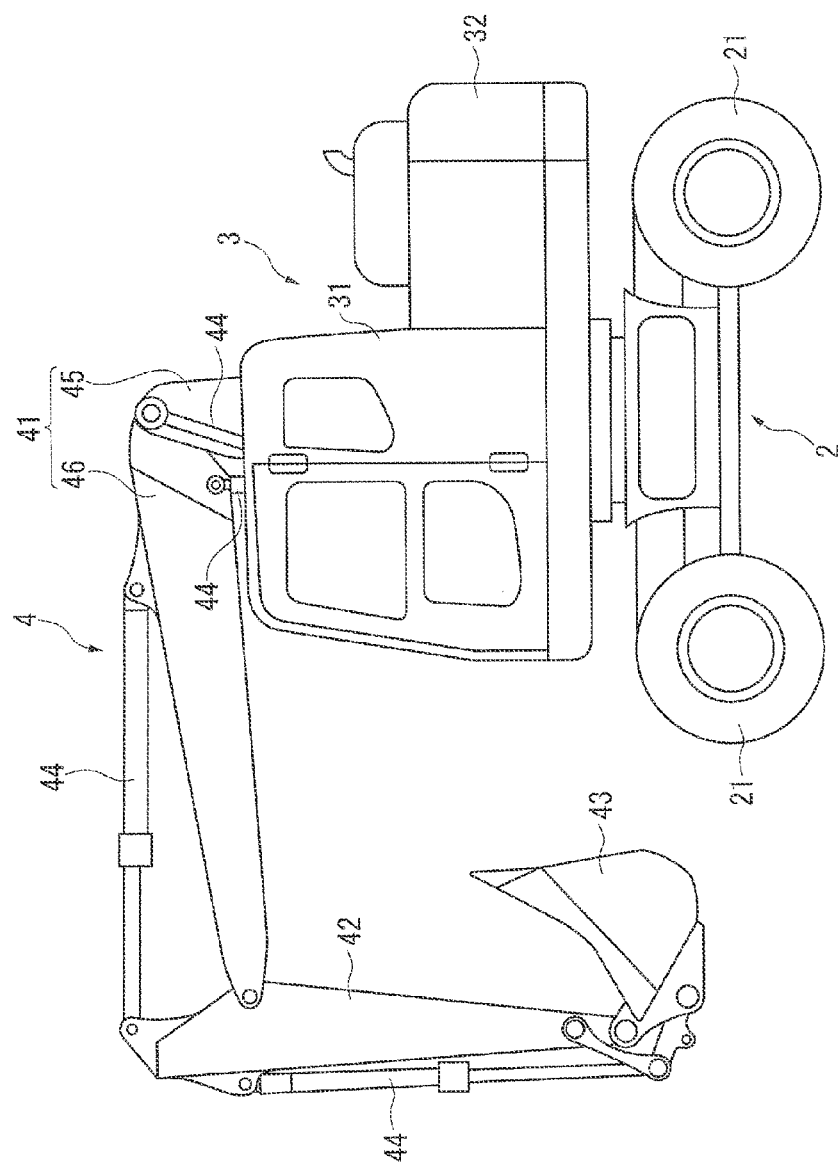
FIG. 16 is a side elevation showing an entirety of a work machine according to another exemplary embodiment of the invention.

Though the hydraulic excavator 1 in the above exemplary embodiment is equipped with the working equipment 4 of a mono-boom structure including the single boom 41, the hydraulic excavator 1 may include working equipment 41 of a two-piece boom structure as shown in FIG. 16. The boom 41 includes a first boom 45 supported by the upper swing body 3 and a second boom 46 connected to an end of the first boom 45, so that the working equipment 4 can be compactly flexed.

Incidentally, though the wheeled hydraulic excavator is described as an example in the above exemplary embodiment, the invention can be applied to the other mobile vehicle. For instance, the invention is applicable to a wheel loader (one of construction machines) including both of working equipment provided by a bucket and the like and a travel mechanism provided by a tire, transmission and the like. In addition, the invention is applicable to a fork lift (industrial vehicle) including working equipment provided by a fork and the like and a travel mechanism including a tire, transmission and the like, or a rough terrain crane (a kind of work machine) including both of working equipment provided by a loading mechanism such as a boom, and a travel mechanism provided by a tire, transmission and the like. This is because, the wheeled hydraulic excavators, wheel loaders, fork lifts and rough terrain cranes all share the common features of a mobile vehicle including both of the working equipment and the travel mechanism, and the fuel consumption during the work by the working equipment and the fuel consumption during the travel of the travel mechanism have to be separately evaluated. Incidentally, the conditions for determining the status of the operation modes conducted in S11 to S13 or S15 shown in FIG. 12 are different per each of the mobile structures of the above mobile vehicles because of the difference in the structures of the mobile vehicles. For instance, though the upper swing body is not present in wheel loaders or fork lifts, the upper swing body is provided to rough terrain cranes.

The invention claimed is:

1. A work machine display unit mounted in a mobile work machine comprising an undercarriage and working equipment that are each driven by an engine, the display unit receiving data of instant fuel consumption from an engine controller that controls a fuel quantity to be supplied to the engine, the display unit comprising:
   a single fuel-consumption indicator that, based on the mobile work machine being in a street mode in which the undercarriage is operated, displays fuel consumption in the street mode, and based on the mobile work machine being in a work mode in which the working equipment is operated, displays fuel consumption in the work mode, the single fuel-consumption indicator being configured to display the street mode and work mode fuel consumptions in a bar format that includes a single target fuel-consumption line;
a full-scale fuel-consumption value calculator that calculates a fuel consumption value corresponding to a full scale of the single fuel-consumption indicator using a scale conversion coefficient for converting one of the target consumption in the street mode and the target consumption in the work mode into the other of the target consumption in the street mode and the target consumption in the work mode; and
a gauge-display-value calculator that calculates a ratio of the instant fuel consumption to the fuel consumption at the full scale calculated by the full-scale fuel-consumption value calculator,
wherein the fuel consumption in the street mode and the fuel consumption in the work mode are displayed on the single fuel-consumption indicator in the bar format based on the ratio, and
wherein a position of the single target fuel-consumption line that is displayed on the single fuel-consumption indicator is calculated using the scale conversion coefficient, such that the position of the single target fuel-consumption line corresponding to the target consumption in the street mode is equal to the position of the single target fuel-consumption line corresponding to the target consumption in the work mode.

2. The work machine display unit according to claim 1, further comprising:
a scale-conversion-coefficient setting table in which the scale conversion coefficient is set.

3. The work machine display unit according to claim 2, wherein
the mobile work machine comprises a mode determining section that determines whether an operation mode of the mobile work machine is the street mode or the work mode
the mode determining section determines that the mobile work machine is in the street mode and sends information that the mobile work machine is in the street mode to the display unit, when it is determined that:
(1) a swing position detector that is provided in the mobile work machine and detects a position of an upper swing body of the mobile work machine in a swing direction detects that the upper swing body is at a predetermined position;
(2) a working equipment lock unit that is provided in the mobile work machine and locks an operation of the working equipment of the mobile work machine outputs an operation signal for locking the working equipment; and
(3) a suspension cylinder lock unit that is provided to the mobile work machine and frees an operation of a suspension cylinder of the undercarriage of the mobile work machine outputs an operation signal for freeing the suspension cylinder, and
when the full-scale fuel-consumption value calculator of the display unit receives the information indicating that the mobile work machine is in the street mode, the full-scale fuel-consumption value calculator reads out a scale conversion coefficient corresponding to the street mode from the scale conversion coefficient setting table and calculates the fuel consumption value at the full scale.

4. A mobile work machine comprising:
an engine;
an undercarriage and working equipment each driven by the engine;
a display unit; and
an engine controller that controls a fuel quantity to be supplied to the engine, wherein
the display unit comprises:
a single fuel-consumption indicator that is adapted to receive data of instant fuel consumption from the engine controller and, based on the mobile work machine being in a street mode in which the undercarriage is operated, displays fuel consumption in the street mode, and based on the mobile work machine being in a work mode in which the working equipment is operated, displays fuel consumption in the work mode, the single fuel-consumption indicator being configured to display the street mode and work mode fuel consumptions in a bar format that includes a single target fuel-consumption line;
a full-scale fuel-consumption value calculator that calculates a fuel consumption value corresponding to a full scale of the single fuel-consumption indicator using a scale conversion coefficient for converting one of the target consumption in the street mode and the target consumption in the work mode into the other of the target consumption in the street mode and the target consumption in the work mode; and
a gauge-display-value calculator that calculates a ratio of the instant fuel consumption to the fuel consumption at the full scale calculated by the full-scale fuel-consumption value calculator,
wherein the fuel consumption in the street mode and the fuel consumption in the work mode are displayed on the single fuel-consumption indicator in the bar format based on the ratio, and
wherein a position of the single target fuel-consumption line that is displayed on the single fuel-consumption indicator is calculated using the scale conversion coefficient, such that the position of the single target fuel-consumption line corresponding to the target consumption in the street mode is equal to the position of the single target fuel-consumption line corresponding to the target consumption in the work mode.

5. The mobile work machine according to claim 4, wherein:
the display unit comprises a scale-conversion-coefficient setting table in which the scale conversion coefficient is set.

6. The mobile work machine according to claim 5, wherein:
the mobile work machine comprises a mode determining section that determines whether an operation mode of the mobile work machine is the street mode or the work mode, wherein
the mode determining section determines that the mobile work machine is in the street mode and sends information that the mobile work machine is in the street mode to the display unit, when it is determined that:
(1) a swing position detector that is provided in the mobile work machine and detects a position of an upper swing body of the mobile work machine in a swing direction detects that the upper swing body is at a predetermined position;
(2) a working equipment lock unit that is provided in the mobile work machine and locks an operation of the working equipment of the mobile work machine outputs an operation signal for locking the working equipment; and (3) a suspension cylinder lock unit that is provided to the mobile work machine and frees an operation of a suspension cylinder of the undercarriage of the mobile work machine outputs an operation signal for freeing the suspension cylinder, and when the full-scale fuel-consumption value calculator of the display unit receives the information indicating that the mobile work machine is in the street mode, the full-scale fuel-consumption value calculator reads out a scale conversion coefficient corresponding to the street mode from the scale conversion coefficient setting table and calculates the fuel consumption value at the full scale.

7. The work machine display unit according to claim 1, further comprising:

a scale selector that selects the scale conversion coefficient, wherein the scale conversion coefficient is determined in advance for each of the street mode and the work mode.

8. The work machine display unit according to claim 1, wherein when the mobile work machine is in the street mode, the gauge-display-value calculator is configured to calculate a ratio of the instant fuel consumption to a first fuel consumption value corresponding to the full scale of the single fuel-consumption indicator, and wherein when the mobile work machine is in the work mode, the gauge-display-value calculator is configured to calculate a ratio of the instant fuel consumption to a second fuel consumption value corresponding to the full scale of the single fuel-consumption indicator, the first and second fuel consumption values being different from each other.

9. The mobile work machine according to claim 4, further comprising:

a scale selector that selects the scale conversion coefficient, wherein the scale conversion coefficient is determined in advance for each of the street mode and the work mode.

10. The mobile work machine according to claim 4, wherein when the mobile work machine is in the street mode, the gauge-display-value calculator is configured to calculate a ratio of the instant fuel consumption to a first fuel consumption value corresponding to the full scale of the single fuel-consumption indicator, and wherein when the mobile work machine is in the work mode, the gauge-display-value calculator is configured to calculate a ratio of the instant fuel consumption to a second fuel consumption value corresponding to the full scale of the single fuel-consumption indicator, the first and second fuel consumption values being different from each other.

11. The work machine display unit according to claim 1, wherein the single fuel-consumption indicator is configured to display i) bars corresponding to actual fuel consumption that is within the target fuel consumption and ii) bars corresponding to actual fuel consumption that exceeds the target fuel consumption.

12. The mobile work machine according to claim 4, wherein the single fuel-consumption indicator is configured to display i) bars corresponding to actual fuel consumption that is within the target fuel consumption and ii) bars corresponding to actual fuel consumption that exceeds the target fuel consumption.

* * * * *